(12) United States Patent
Cherian et al.

(10) Patent No.: US 11,431,529 B2
(45) Date of Patent: Aug. 30, 2022

(54) MULTI-AP SOUNDING PREPARATION PHASE

(71) Applicant: QUALCOMM Incorporated, San Diego, CA (US)

(72) Inventors: George Cherian, San Diego, CA (US); Lochan Verma, Danville, CA (US); Alfred Asterjadhi, San Diego, CA (US); Sameer Vermani, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 30 days.

(21) Appl. No.: 17/077,641

(22) Filed: Oct. 22, 2020

(65) Prior Publication Data

US 2021/0152396 A1 May 20, 2021

Related U.S. Application Data

(60) Provisional application No. 62/937,366, filed on Nov. 19, 2019.

(51) Int. Cl.
*H04B 7/0452* (2017.01)
*H04L 25/02* (2006.01)
*H04W 48/16* (2009.01)

(52) U.S. Cl.
CPC ....... *H04L 25/0226* (2013.01); *H04B 7/0452* (2013.01); *H04W 48/16* (2013.01)

(58) Field of Classification Search
CPC ............. H04L 25/0226; H04L 25/0204; H04L 5/0035; H04L 5/005; H04L 25/0224;
(Continued)

(56) References Cited

U.S. PATENT DOCUMENTS

2016/0345258 A1* 11/2016 Zhou ..................... H04W 48/16
2018/0234135 A1 8/2018 Vermani et al.
(Continued)

FOREIGN PATENT DOCUMENTS

EP 3162028 B1 10/2019

OTHER PUBLICATIONS

International Search Report and Written Opinion—PCT/US2020/057089—ISA/EPO—dated Feb. 3, 2021.

*Primary Examiner* — Minh Trang T Nguyen
(74) *Attorney, Agent, or Firm* — Patterson+ Sheridan, L.L.P.

(57) ABSTRACT

This disclosure provides systems, methods and apparatus, including computer programs encoded on computer storage media, for group formation and sounding for distributed multi-user multiple input multiple output (MU-MIMO). Some implementations include a method of wireless communication. The method includes a sounding preparation phase that includes transmitting, to the plurality of access points, a first frame inviting the plurality of access points to perform a beamformed distributed transmission from the plurality of access points to a group of stations; receiving a second frame from at least one of the plurality of access points based on transmitting the first frame, the second frame including at least one identifier of at least one station in a different basic service set than a basic service set of the first access point; and identifying the group of stations based on the at least one identifier included in the second frame.

42 Claims, 11 Drawing Sheets

(58) Field of Classification Search
CPC .... H04B 7/0452; H04B 7/024; H04B 7/0626; H04W 48/16
See application file for complete search history.

(56) References Cited

U.S. PATENT DOCUMENTS

2019/0028168 A1   1/2019  Vermani et al.
2019/0036583 A1   1/2019  Cherian et al.

* cited by examiner

MULTI-AP SOUNDING PREPARATION PHASE

CROSS REFERENCE TO RELATED APPLICATION

This Application hereby claims priority under 35 U.S.C. § 119 to U.S. Provisional Patent Application No. 62/937,366, filed on Nov. 19, 2019, the contents of which are incorporated herein in their entirety.

TECHNICAL FIELD

This disclosure relates generally to wireless communications and, more particularly to systems and methods for a preparation phase for sounding for distributed multi-user multiple input multiple output (MU-MIMO).

DESCRIPTION OF THE RELATED TECHNOLOGY

A wireless local area network (WLAN) may be formed by two or more WLAN devices (which may be referred to as stations (STAs)) that share a wireless communication medium using common service settings. One or more of the WLAN devices (which may be referred to as an access point (AP)) may establish the common service settings. An AP is a type of STA that performs a distribution system access function in the WLAN. The basic building block of a WLAN conforming to the Institute of Electrical and Electronics Engineers (IEEE) 802.11 family of standards is a Basic Service Set (BSS), which is managed by an AP. Each BSS is identified by an identifier such as a service set identifier (SSID) that is advertised by the AP.

To address the issue of increasing bandwidth requirements that are demanded for wireless communication systems, different schemes are being developed to allow multiple STAs to communicate with a single AP or multiple APs by sharing the channel resources while achieving high data throughputs. In a distributed MU-MIMO system, multiple APs may simultaneously serve a plurality of spatially separated STAs by coordinating beamforming by the antennas of the multiple APs. For example, multiple APs may coordinate transmissions to each STA.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication at a first access point of a plurality of access points. The method includes transmitting, to the plurality of access points, a first frame inviting the plurality of access points to perform a beamformed distributed transmission from the plurality of access points to a group of stations; receiving a second frame from at least one of the plurality of access points based on transmitting the first frame, the second frame including at least one identifier of at least one station in a different basic service set than a basic service set of the first access point; identifying the group of stations based on the at least one identifier included in the second frame; transmitting, to at least a subset of the group of stations, an announcement frame for performing a channel sounding procedure for the beamformed distributed transmission, the announcement frame including the at least one identifier; transmitting a packet for channel sounding after transmitting the announcement frame; receiving feedback information from at least the subset of the group of stations based on the packet for channel sounding; and transmitting, to the group of stations from the first access point, the beamformed distributed transmission based on the feedback information.

Another innovative aspect of the subject matter described in this disclosure can be implemented as a method for wireless communication at a first access point of a plurality of access points. The method includes receiving a first frame from at least one of the plurality of access points, the first frame including at least one identifier of at least one station associated with the at least one of the plurality of access points, the at least one station being in a different basic service set than a basic service set of the first access point; transmitting, to the at least one station, based on receiving the first frame, a multi-user physical layer protocol data unit (MU PPDU) including a basic service set color value identifying the first access point, at least one station information field containing identifiers of the plurality of access points, and a plurality of physical layer service data units (PSDUs), at least one of the plurality of PSDUs containing a second frame that includes the at least one identifier of the at least one station; receiving feedback information from the at least one station based on transmitting the MU PPDU; and transmitting, from the first access point, a beamformed distributed transmission based on the feedback information.

Another innovative aspect of the subject matter described in this disclosure can be implemented as a method for wireless communication at a second access point of a plurality of access points. The method includes receiving, from a first access point of the plurality of access points, a first frame inviting the plurality of access points to perform a beamformed distributed transmission from the plurality of access points to a group of stations; and transmitting, in response to receiving the first frame, a second frame for preparation of a sounding phase prior to the beamformed distributed transmission, the second frame including at least one identifier of at least one station in a basic service set of the second access point, the basic service set of the second access point being different than a basic service set of the first access point.

Another innovative aspect of the subject matter described in this disclosure can be implemented as a method for wireless communication at station. The method includes receiving, from a first access point of a plurality of access points, an announcement frame for performing a channel sounding procedure for a beamformed distributed transmission, the first access point being in a different basic service set than a basic service set of the station, the announcement frame including an identifier of the station; receiving, from the first access point, a packet for channel sounding after receiving the announcement frame; transmitting, to the first access point, feedback information after receiving the packet for channel sounding; and receiving, from the first access point, the beamformed distributed transmission after transmitting the feedback information.

Aspects of the present disclosure also provide various access point, access station, apparatus, means, and computer-readable medium, and computer program products corresponding to the methods and operations described above.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
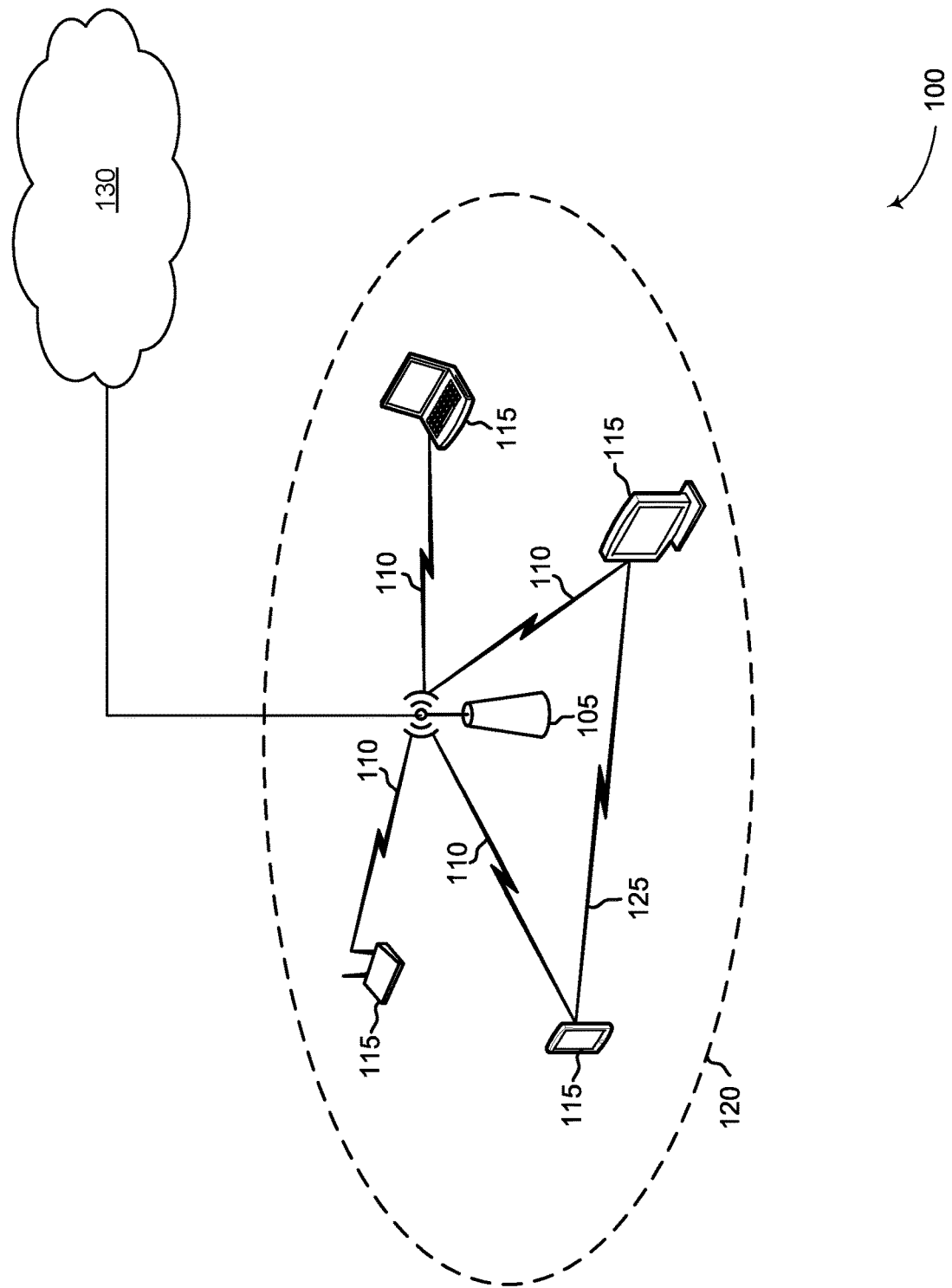
FIG. 1 illustrates an example wireless communications network that supports a sounding preparation phase of a sounding procedure for distributed multi-user multiple input multiple output (MU-MIMO) in accordance with aspects of the present disclosure.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, new radio (NR), or other known signals that are used to communicate within a wireless, cellular or internet of things (IOT) network, such as a system utilizing 3G, 4G or 5G, or further implementations thereof, technology.

The techniques may be incorporated into (such as implemented within or performed by) a variety of wired or wireless apparatuses (such as nodes). In some implementations, a node includes a wireless node. Such a wireless node may provide, for example, connectivity to or for a network (such as a wide area network (WAN) such as the Internet or a cellular network) via a wired or wireless communication link. In some implementations, a wireless node may include an access point (AP) or a station (STA).

Multiple APs may transmit to multiple STAs at a time by using distributed multi-user multiple input multiple output (MU-MIMO). For example, multiple APs may transmit data to one or more STAs at a time, meaning the transmission of data to the one or more STAs is distributed between the multiple APs. The multiple APs may utilize beamforming to steer signals spatially to the one or more STAs. For the multiple APs to perform distributed MU-MIMO, the multiple APs coordinate the beamforming performed by each AP to reduce interference for transmitting data to the one or more STAs. The multiple APs perform a procedure to form a group of APs to transmit to the one or more STAs. Further, to coordinate the beamforming between the multiple APs, the multiple APs perform a sounding procedure to gather feedback information from the one or more STAs about wireless channels between the multiple APs and the one or more STAs. The multiple APs may utilize the feedback information to perform beamforming during a beamformed distributed transmission.

During the sounding procedure, each of the multiple APs may obtain channel information from one or more STAs that are associated with neighboring overlapping basic service set (OBSS) APs. In other words, each AP may obtain channel information from one or more STAs that are not part of its own basic service set (BSS). According to some aspects, a sounding preparation phase may precede the sounding procedure in order to facilitate sounding between each of the multiple APs and the one or more STAs associated with neighboring OBSS APs. In some aspects, during the sounding preparation phase, an initiating AP of the multiple APs may form a group of STAs for participation in the sounding procedure and further, the beamformed distributed transmission.

In some aspects, the initiating AP may invite a rest of the multiple APs to perform the beamformed distributed transmission. In some aspects, one or more of the multiple APs may identify which STAs in its own BSS that will participate in the sounding procedure and the beamformed distributed transmission in response to receiving the invitation from the initiating AP. In some aspects, the one or more of the multiple APs may transmit a frame to its associated participating STAs, such as in a multi-user physical layer protocol data unit (MU PPDU), the frame including identifiers for which of its STAs are participating in the sounding procedure; and the initiating AP may hear the frame. In some aspects, the one or more of the multiple APs may transmit a frame directly to the initiating AP, such as in a trigger based physical layer protocol data unit (TB PPDU), the frame including identifiers of its participating STAs. In some aspects, the initiating AP may identify the group of STAs based on the identifiers in the frame, and the sounding procedure may begin thereafter. For example, after the sounding preparation phase, the initiating AP may perform a sounding procedure, e.g., transmission of a null data packet announcement (NDPA), transmission of a null data packet (NDP), transmission of a trigger frame to the group of STAs, and reception of feedback information from the group of STAs.

According to some aspects, each of the multiple APs may notify its associated STAs within its own BSS, which OBSS APs to listen to during the sounding procedure so that the STAs do not listen to random OBSS APs. In some aspects, each of the multiple APs may decide which of its associated STAs will participate in the sounding procedure. For example, the sounding procedure may be performed for STAs that have data for the beamformed distributed transmission, and only the AP which is associated to such STAs may have updated buffer status information of those STAs. In some aspects, unique identifiers across the BSSs of the multiple APs may be used for STAs participating in the sounding procedure. In some aspects, the unique identifiers may be assigned to the participating STAs during the sounding preparation phase. In some aspects, the unique identifiers may be temporary to avoid security issues. In some aspects, each of the unique identifiers may comprise an association identifier (AID) of a participating STA in combination with a color code, or BSS color identifier, of the BSS or AP that is associated with the participating STA.

One or more of the following potential advantages may be realized. For example, APs can form a group of STAs in preparation for a sounding procedure and subsequent beamformed distributed transmission using over the air signaling as opposed to communicating over a backhaul. This may reduce data congestion on the backhaul. Additionally, the sounding procedures may allow for coordinated gathering of feedback information by multiple APs from STAs. Accordingly, the feedback information for the multiple APs may include channel conditions for each of the multiple APs coordinated in time, which may improve the accuracy of the beamforming based on the feedback information.

FIG. 1 illustrates an example wireless communication network 100 that supports reporting mechanisms in accordance with aspects of the present disclosure. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of standards defined by the IEEE 802.11-2016 specification or amendments thereof (such as IEEE 802.11a, 802.11b, 802.11g, 802.11n, 802.11ac, 802.11ah, 802.11aq, 802.11ad, 802.11ay, 802.11az, 802.11ba, 802.11ax, 802.11be, etc.). The WLAN 100 may include numerous wireless communication devices such as an AP 105 and multiple STAs 115 having wireless associations with the AP 105. The IEEE 802.11-2016 specification defines a STA as an addressable unit. An AP is an entity that contains at least one STA and provides access via a wireless medium (WM) for associated STAs to access a distribution service (such as another network 130). Thus, an AP includes a STA and a distribution system access function (DSAF). In the example of FIG. 1, the AP 105 may be connected to a gateway device (not shown) which provides connectivity to the other network 130. The DSAF of the AP 105 may provide access between the STAs 115 and another network 130. While AP 105 is described as an access point using an infrastructure mode, in some implementations, the AP 105 may be a traditional STA which is operating as an AP. For example, the AP 105 may be a STA capable of operating in a peer-to-peer mode or independent mode. In some other examples, the AP 105 may be a software AP (SAP) operating on a computer system.

Each of the STAs 115 also may be referred to as a mobile station (MS), a mobile device, a mobile handset, a wireless handset, an access terminal (AT), a user equipment (UE), a user terminal (UT), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), wearable devices, music or other audio or stereo devices, remote control devices ("remotes"), printers, kitchen or other household appliances, key fobs (for example, for passive keyless entry and start (PKES) systems), among other possibilities.

The AP 105 and the associated STAs 115 may be referred to as a BSS, which is managed by the AP 105. A BSS refers to one STA (such as an AP) that has established service settings and one or more STAs that have successfully synchronized the service settings. Alternatively, a BSS may describe a set of STAs have synchronized matching mesh service profiles. Using the example architecture in FIG. 1, the BSS may be identified by an identifier such as a service set identifier (SSID) that is advertised by the AP 105. The AP 105 may periodically broadcast beacon frames ("beacons") to enable any STAs 115 within wireless range of the AP 105 to establish or maintain a respective communication link 110 (also referred to as a "Wi-Fi link" or "wireless association") with the AP. An "unassociated STA" (not shown) may not be considered part of the BSS because they do not have a wireless session established at the AP 105. The various STAs 115 in the WLAN 100 may be able to communicate with external networks as well as with one another via the AP 105 and respective communication links 110.

To establish a communication link 110 with an AP 105, each of the STAs 115 is configured to perform passive or active scanning operations ("scans") on frequency channels in one or more frequency bands (for example, the 2.4 GHz, 5 GHz, 6 GHz or 60 GHz bands). To perform passive scanning, a STA listens for beacons, which are transmitted by respective APs 102 at a periodic time interval referred to as the target beacon transmission time (TBTT) (measured in time units (TUs) where one TU is equal to 1024 microseconds (s)). To perform active scanning, a STA 115 generates and sequentially transmits probe requests on each channel to be scanned and listens for probe responses from APs 105. Each STA 115 may be configured to identify or select an AP 105 with which to associate based on the scanning information obtained through the passive or active scans, and to perform authentication and association operations to establish a communication link with the selected AP 105.

FIG. 1 additionally shows an example coverage area 120 of the AP 105, which may represent a basic service area (BSA) of the WLAN 100. While one AP 105 is shown in FIG. 1, the WLAN 100 can include multiple APs. Although not shown in FIG. 1, a STA 115 may be located in the intersection of more than one coverage area 120 and may associate with more than one AP 105. A single AP 105 and an associated set of STAs 115, or multiple APs 105 and associated sets of STAs 115 may be referred to as a basic service set (BSS). As a result of the increasing ubiquity of wireless networks, a STA 115 may have the opportunity to select one of many BSSs within range of the STA 115 or select among multiple APs that together form an extended service set (ESS) including multiple connected BSSs. An ESS is a set of connected BSSs. An extended network station associated with the WLAN 100 may be connected to a wired or wireless distribution system (not shown). The distribution system may allow multiple APs to be connected in such an ESS. As such, a STA 115 can be covered by more than one AP 105 and can associate with different APs at different times for different transmissions.

In some cases, the coverage area 120 of an AP 105 may be divided into sectors (not shown). The WLAN 100 may include APs 105 of different types (e.g., metropolitan area, home network, etc.), with varying and overlapping coverage areas 120. Two or more STAs 115 may also communicate directly via a direct wireless link 125 regardless of whether both STAs 115 are in the same coverage area 120. Examples of direct wireless links 125 may include Wi-Fi Direct connections, Wi-Fi Tunneled Direct Link Setup (TDLS) links, and other group connections. For example, peer-to-peer connections or ad hoc networks may be implemented within WLAN 100.

The APs 105 and STAs 115 may function and communicate (via the respective communication links 110 and 125) according to the IEEE 802.11 family of standards (such as that defined by the IEEE 802.11-2016 specification or amendments thereof including, but not limited to, 802.11a, 802.11b, 802.11g, 802.11n, 802.11ac, 802.11ah, 802.11aq, 802.11ad, 802.11ay, 802.11az, 802.11ba, 802.11ax, 802.11be, etc.). These standards define the WLAN radio and baseband protocols for the PHY and MAC layers. The APs 105 and STAs 115 transmit and receive frames (which also may be referred to as transmissions, communications, or wireless communications) to and from one another in the form of PPDUs. Each PPDU is a composite frame that includes a PLCP preamble and header (which also may be referred to as a PHY preamble and header) as well as one or more PSDUs (which may be derived from MPDUs in the MAC layer), each including a MAC header.

The APs 105 and STAs 115 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 105 and STAs 115 described herein also may communicate in other frequency bands, such as the 6 GHz band, which may support both licensed and unlicensed communications. The APs 105 and STAs 115 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be (which also may be referred to as extreme high throughput (EHT)) standard amendments may be transmitted over the 2.4 and 5 GHz bands, each of which is divided into multiple 20 MHz channels. As such, these PPDUs may be transmitted over a physical channel having a minimum bandwidth of 20 MHz. But larger channels can be formed through channel bonding. For example, PPDUs conforming to the IEEE 802.11n, 802.11ac, 802.11ax, and 802.11be standard amendments may be transmitted over physical channels having bandwidths of 40 MHz, 80 MHz or 160 MHz by bonding together two or more 20 MHz channels. For example, IEEE 802.11n described the use of up to 2 channels (for a combined 40 MHz bandwidth) and defined a High Throughput (HT) transmission format. IEEE 802.11ac described the use of up to 8 channels (for a maximum combined 160 MHz bandwidth) and defined a Very High Throughput (VHT) transmission format. IEEE 802.11ax also supports up to a combined 160 MHz bandwidth (which may be a combination of up to 8 channels of 20 MHz width each). IEEE 802.11be may support up to a combined 320 MHz bandwidth (which may be a combination of up to 16 channels of 20 MHz width each).

Figure 2:
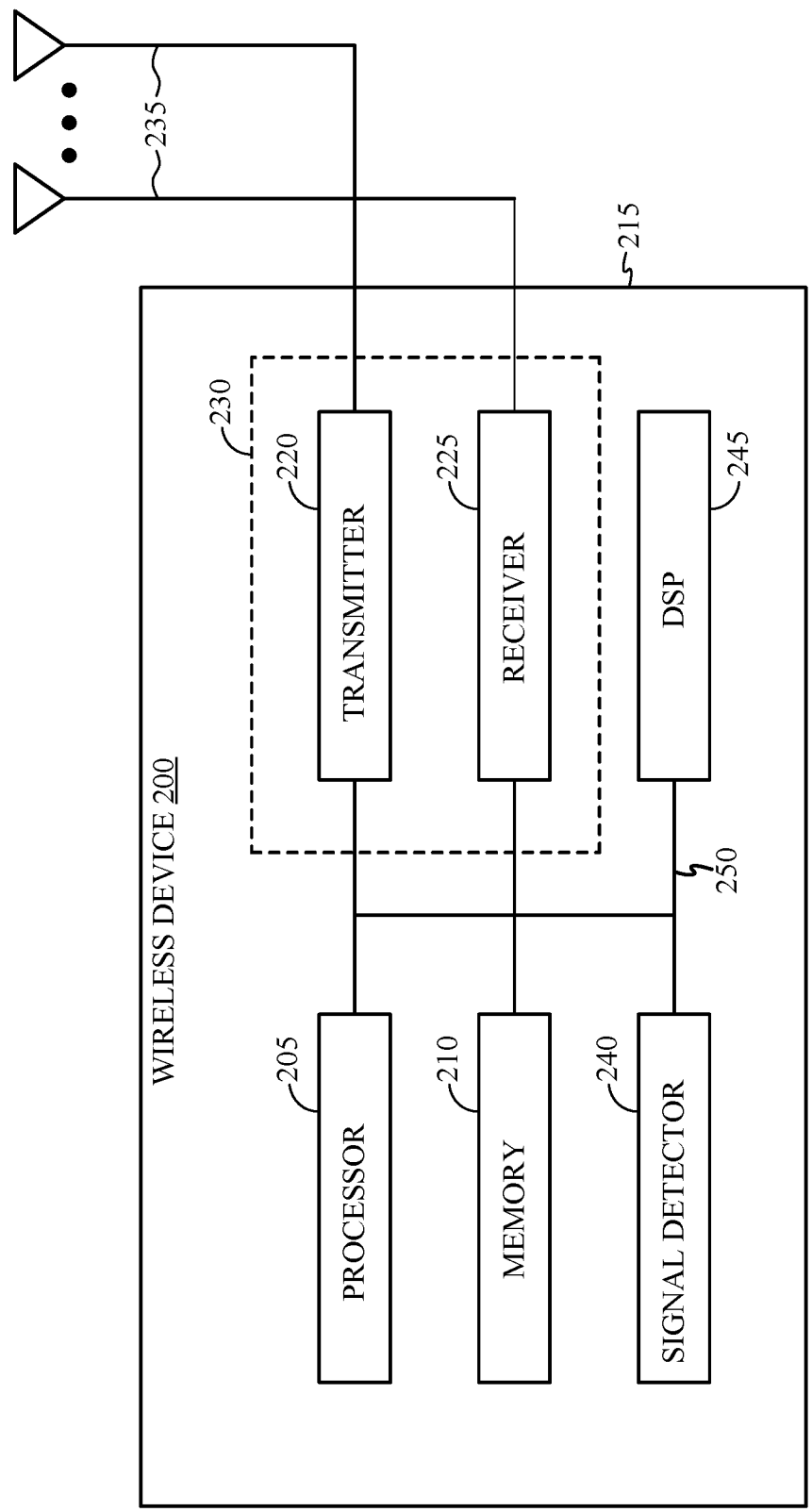
FIG. 2 illustrates an example of various components that may be utilized in a wireless node that supports a sounding preparation phase of a sounding procedure for distributed MU-MIMO in accordance with aspects of the present disclosure.

FIG. 2 illustrates an example of various components that may be utilized in a wireless node or wireless device 200 that supports reporting mechanisms in accordance with aspects of the present disclosure. In some examples, the wireless device 200 may implement aspects of wireless communication network 100. The wireless device 200 is an example of a device that may be configured to implement the various methods described herein. The wireless device 200 may implement an AP 105 or a STA 115.

The wireless device 200 may include a processor 205 which controls operation of the wireless device 200. The processor 205 may also be referred to as a central processing unit (CPU). Memory 210, which may include both read-only memory (ROM) and random-access memory (RAM), provides instructions and data to the processor 205. A portion of the memory 210 may also include non-volatile random-access memory (NVRAM). The processor 205 may perform logical and arithmetic operations based on program instructions stored within the memory 210. The instructions in the memory 210 may be executable to implement the methods described herein.

The processor 205 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 200 may also include a housing 215 that may include a transmitter 220 and a receiver 225 to allow transmission and reception of data between the wireless device 200 and a remote node. The transmitter 220 and receiver 225 may be combined into a transceiver 230. A single or a plurality of transceiver antennas 235 may be attached to the housing 215 and electrically coupled to the transceiver 230. The wireless device 200 may also include (not shown) multiple transmitters, multiple receivers, and multiple transceivers.

The wireless device 200 may also include a signal detector 240 that may be used in an effort to detect and quantify the level of signals received by the transceiver 230. The signal detector 240 may detect such signals as total energy, energy per subcarrier per symbol, power spectral density and other signals. The wireless device 200 may also include a digital signal processor (DSP) 245 for use in processing signals.

The various components of the wireless device 200 may be coupled together by a bus system 250, which may include a power bus, a control signal bus, and a status signal bus in addition to a data bus.

Although a number of separate components are illustrated in FIG. 2, those of skill in the art will recognize that one or more of the components may be combined or commonly implemented. For example, the processor 205 may be used to implement not only the functionality described above with respect to the processor 205, but also to implement the functionality described above with respect to the signal detector 240 and/or the DSP 245. Further, each of the components illustrated in FIG. 2 may be implemented using a plurality of separate elements. Moreover, additional components not illustrated in FIG. 2 may be included in the wireless device 200. Those of skill in the art will also recognize that one or more components illustrated in FIG. 2 may not be included in the wireless device 200.

Certain aspects of the present disclosure support transmitting and receiving an uplink (UL) signal, a downlink (DL) signal, or a peer-link signal between one or more STAs and/or APs, such as between a STA and an AP, an AP and a STA, a STA and another STA, and/or an AP and another AP. In some examples, the signals may be transmitted in a multi-user multiple input multiple output (MU-MIMO) system. Alternatively, the signals may be transmitted in a multi-user orthogonal frequency-division multiple access (MU-OFDMA) or other FDMA system. In some aspects, these signals may be transmitted using one or more of the transmitter 220 or the transceiver 230. The wireless device 200 may comprise an AP 105 or a STA 115, and may be used to transmit and receive communications. That is, either AP 105 or STA 115 may serve as transmitter devices and/or receiver devices.

Distributed MU-MIMO

As discussed with respect to FIGS. 1 and 2, a single AP 105 may transmit to multiple STAs 115 at a time by using MU-MIMO. The AP 105 includes multiple antennas 235. Using the multiple antennas 235, the AP 105 can utilize beamforming to focus the energy of a transmitted signal spatially (such as to a STA 115 as a spatial stream). To perform beamforming, the AP 105 may exchange frames with the STA 115 to measure a channel between the AP 105 and the STA 115. For example, the AP 110 may transmit a null data packet (NDP) including one or more long training fields (LTFs) that the STA 115 uses to measure the channel. The STA 115 may generate channel feedback information (such as a feedback matrix) based on the channel measurements, and send the feedback matrix to the AP 105. Using the feedback matrix, the AP 105 may derive a steering matrix, which the AP 105 uses to determine how to transmit a signal on each antenna 235 of the AP 105 to perform beamforming. For example, the steering matrix may be indicative of a phase shift, power level, etc. to transmit a signal on each of the antennas 235. For example, the AP 105 may be configured to perform similar beamforming techniques as discussed in one of the 802.11 standards.

In some implementations, multiple APs 105 may be configured to transmit to one or more STAs 115 at a time utilizing distributed MU-MIMO. There may be multiple different types of MU-MIMO transmissions, including coordinated beamforming (COBF) and joint processing transmission (JT).

Figure 3:
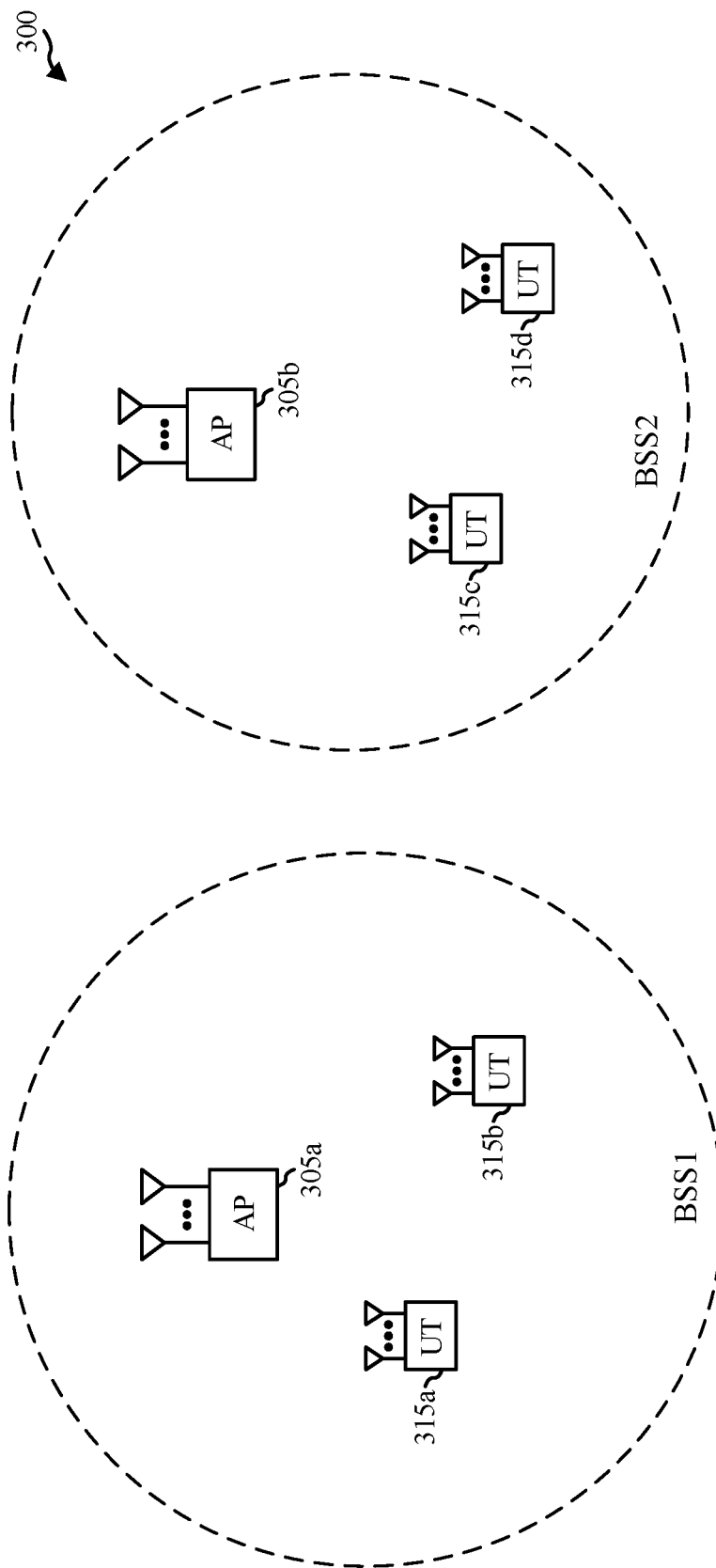
FIG. 3 illustrates an example of a distributed MU-MIMO system that supports a sounding preparation phase of a sounding procedure for distributed MU-MIMO in accordance with aspects of the present disclosure.

FIG. 3 illustrates a distributed MU-MIMO system 300. As shown, system 300 includes an AP 305a and an AP 305b. The APs 305a and 305b, in some implementations, refer to the AP 105 described with respect to FIG. 1. The AP 305a is shown as part of a first basic service set (BSS), BSS1, and the AP 305b is shown as part of a second BSS, BSS2. The AP 305a and the AP 305b may be neighboring APs. Further, portions of the coverage area of the AP 305a may overlap with portions of the coverage area of BSS2, leading to an overlapping BSS (OBSS) situation. Communications by the AP 305a with STAs in BSS1 may be referred to as in BSS communications. Similarly, communication by the AP 305b with STAs in BSS2 may be referred to as in BSS communications. Further, communications by the AP 305a with STAs in BSS2 may be referred to as OBSS communications, and communications by the AP 305b with STAs in BSS1 may be referred to as OBSS communications.

In COBF, signals (such as data) for a given STA may be transmitted by only a single AP. For example, the STAs 315a and 315b are shown as part of BSS1 and therefore only the AP 305a may transmit signals intended for the STAs 315a and 315b. Further, STAs 315c and 315d are shown as part of BSS2 and therefore only the AP 305b may transmit signal intended for the STAs 315c and 315d. The STAs 315a through 315d, in some implementations, refer to the STA 115 described with respect to FIG. 1. However, as discussed, the coverage area of the AP 305a and the AP 305b may overlap, and therefore signals transmitted by the AP 305a may reach the STAs 315c and 315d in BSS2 as OBSS signals. Similarly, signals transmitted by the AP 305b may reach the STAs 315a and 315b in BSS1 as OBSS signals. In COBF, the APs 305a and 305b may be configured to perform beamforming to form nulls in the direction of STAs in OBSS, such that any signals received at an OBSS STA are of a low power. For example, the AP 305a may be configured to perform beamforming to form nulls toward the STAs 315c and 315d, and the AP 305b may be configured to form nulls toward the STAs 315a and 315b to limit the interference at the STAs. Accordingly, in COBF, APs are configured to form nulls for OBSS STAs and configured to beamform signals to in-BSS STAs.

In JT, signals for a given STA may be transmitted by multiple APs. For example, one or more of STAs 315a through 315d may receive signals from both the AP 305a and the AP 305b. For the multiple APs to transmit data to a STA, the multiple APs may all need a copy of the data to be transmitted to the STA. Accordingly, the APs may need to exchange the data between each other for transmission to a STA. For example, the AP 305a may have data to transmit to STA 315a, and may further communicate that data over a backhaul to the AP 305b. The AP 305a and the AP 305b may then beamform signals including the data to the STA 315a.

In JT, the antennas of the multiple APs transmitting to one or more STAs may be considered as one large antenna array (such as virtual antenna array) used for beamforming and transmitting signals. Accordingly, similar beamforming techniques as discussed and used for transmitting from multiple antennas of a single AP to one or more STAs, may instead be used for transmitting from multiple antennas of multiple APs. For example, the same beamforming, calculating of steering matrices, etc. for transmitting from multiple antennas of the AP 305a, may be applied to transmitting from the multiple antennas of both the AP 305a and the AP 305b. The multiple antennas of the multiple APs may be able to form signals on a plurality of spatial streams (such as limited by the number of antennas). Accordingly, each STA may receive signals on one or more of the plurality of spatial streams. In some implementations, each AP may be allocated a certain number of the plurality of spatial streams for transmission to STAs in the BSS of the AP. Each spatial stream may be identified by a spatial stream index.

In some implementations, various factors may affect distributed MU-MIMO. For example, one factor may be channel feedback accuracy. To perform beamforming, APs may exchange signals with STAs over a communication channel, and the STAs may make measurements of the channel based on the exchanged signals. The STAs may further send information regarding the channel measurements to the APs as channel feedback information. The APs may utilize the channel feedback information to perform beamforming. However, the channel conditions may change between when the APs receive the channel feedback information and when the APs transmit signals on the channel. This may be referred to as channel aging. Further, there may be inaccuracy due to quantization of the information included in the channel feedback information. This may impact both COBF and JT distributed MU-MIMO and lead to leakage and interference.

Another factor may be phase offsets between APs. For example, APs may transmit with different phases due to timing synchronization differences between the APs. Further, the difference in phases may drift or change (such as due to phase noise, timing drift, carrier frequency offset (CFO) drift, etc.) between when the channel feedback information is received and when the APs transmit to the STAs. This change in phase difference may not affect COBF significantly as each AP performs beamforming independently. However, this change in phase difference may affect JT as the APs perform beamforming together.

Another factor may be timing offset. For example, the delay spread, filter delay, and arrival time spread of APs using JT and COBF may need to be absorbed with a cyclic prefix (CP). For JT, additionally, the relative timing offset (i.e., the change in timing offset between when the channel feedback information is measured and when the signals are transmitted) also may affect phase offsets and may need to be further controlled. Another factor may be CFO. In COBF, the synchronization requirements for CFO may be reduced as compared to JT. Another factor may be gain mismatch, where different APs use different gain states while measuring channels of STAs. This may have a larger effect on JT than COBF. In some implementations of COBF, the largest gain may be approximately 75% of the minimum of number of transmit antennas of any of the APs. In some implementations of JT, the largest gain may be approximately 75% of the sum of the transmit antennas of all the APs.

In some implementations, in MU-MIMO for a single AP transmitting to multiple STAs, to perform channel measurements for beamforming, all the transmit antennas of the AP are sounded together, meaning that all the transmit antennas transmit NDP during the same transmission time interval (such as TTI, frame, subframe, etc.). All antennas may be sounded together, because if NDPs for each antenna were transmitted at different TTIs, they may be transmitted with different phases and the receiver automatic gain control (RxAGC) (which may affect the gain applied to the received signal) at each STA receiving the NDPs may be different for different TTIs, which may make it difficult to stitch together measurements from the different NDPs. Further, the relative timing (such as with respect to the start of a TTI) among all transmit antennas for transmitting NDP at the same TTI is constant for all the transmit antennas, and remains the same for when the NDP is transmitted and for when data is later transmitted to the STAs based on channel feedback information. Therefore, there is no change in relative timing between NDP transmission and data transmission, thereby ensuring better beamforming.

In some implementations, all antennas for multiple APs may be sounded together to transmit NDP together at the same TTI for JT in a joint sounding procedure, to avoid issues discussed. In some implementations, the NDPs of different APs may be sounded at the same TTI using one or more techniques such as time-division multiplexing (TDM), code-division multiplexing (CDM) (such as using a P-matrix), and frequency-division multiplexing (FDM).

For COBF, the beamforming direction of one AP does not depend on the channels between STAs and other APs. Accordingly, only loose synchronization may be needed between APs. Therefore, for COBF, in addition to being able to use a joint sounding procedure, a sequential sounding procedure can be used where APs sound one at a time in separate TTIs and transmit NDPs at different TTIs per AP.

Figure 4:
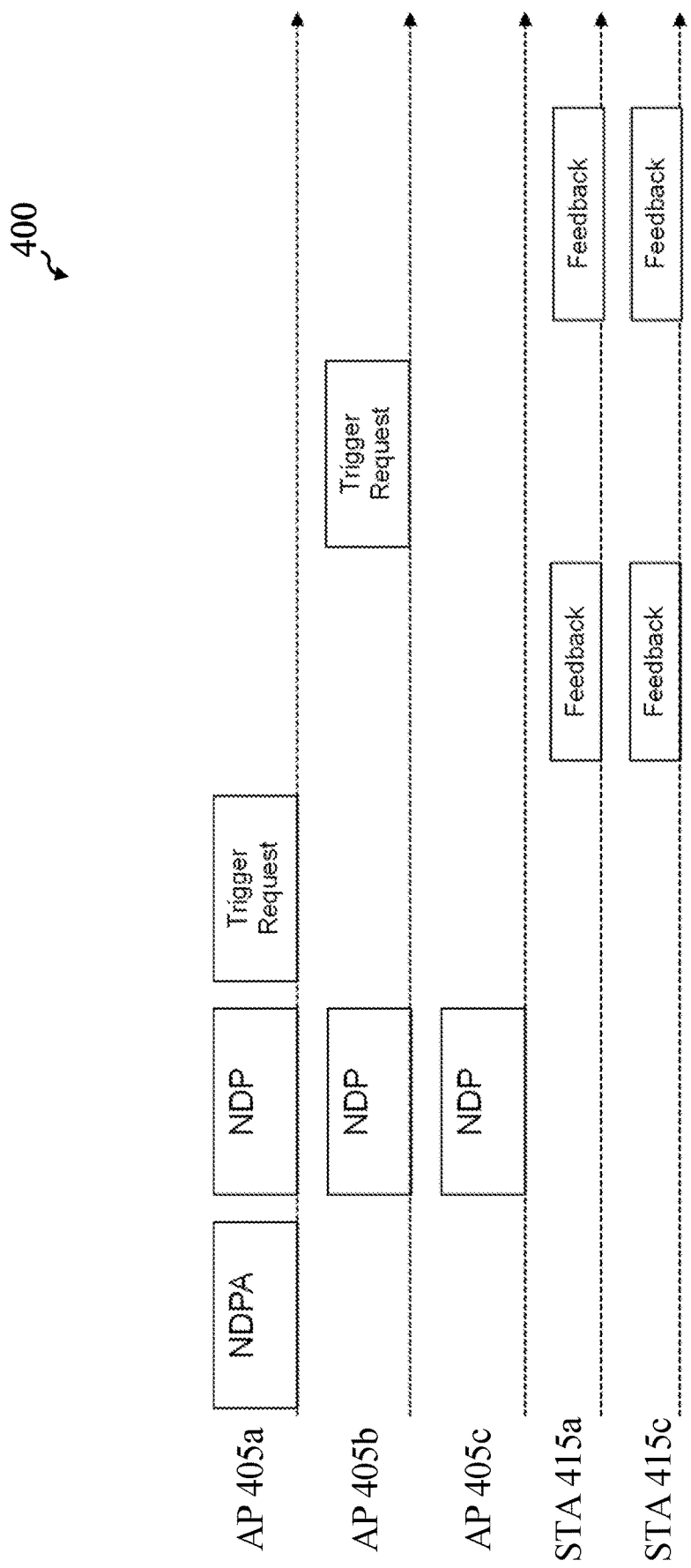
FIG. 4 illustrates a signal diagram of an example joint sounding procedure for distributed MU-MIMO in accordance with aspects of the present disclosure.

FIG. 4 illustrates a signal diagram 400 of an example joint sounding procedure for distributed MU-MIMO. As shown, three APs 405a, 405b, and 405c may coordinate to perform a beamformed distributed MU-MIMO transmission to two STAs, 415a and 415c. In some implementations, the STAs 415a and 415c may be part of different BSSs. For example, the STA 415a may be associated with AP 405a, and the STA 415c may be associated with the AP 405b. It should be noted that distributed MU-MIMO transmission may be made from any number of APs to any number of one or more STAs. In the signal diagram, time is shown as increasing along the x-axis. Initially, any one of the APs (which in FIG. 4 is shown as the AP 405a) transmits a NDP announcement (NDPA) frame. The NDPA may be a control frame that indicates an NDP is going to be transmitted. In some implementations, the NDPA includes information identifying one or more STAs 415a and 415c that the upcoming NDP is directed to, so the one or more STAs receiving the NDPA know to listen for the NDP to perform channel measurements. Accordingly, in the present example, the NDPA may include identifiers of the STAs 415a and 415c. Since the NDPA sent from the AP 405a may identify the STAs 415 associated with other APs, the NDPA may therefore identify STAs in the BSS of the AP 405a and OBSSs of the AP 405a.

In some implementations, the NDPA may include allocation information of spatial streams to the APs 405a, 405b, and 405c. For example, the allocation information may include a mapping or correlation of spatial stream indices to the APs 405a, 405b, and 405c. An allocation of a spatial stream to a particular AP may indicate that the spatial stream is to be used for transmission in the BSS of the particular AP.

In some implementations, the NDPA may include the allocation information of spatial streams to the STAs 415a and 415c. For example, the allocation information may include a mapping or correlation of spatial stream indices to the STAs 415a and 415c. An allocation of a spatial stream to a may indicate that the spatial stream is to be used for transmission to the STA.

In some implementations, the NDPA may include an identification (such as BSS ID, MAC address, etc.) of APs (in this example APs 405a, 405b, and 405c) that are to participate in the joint sounding procedure.

After the AP 405a transmits the NDPA, each of the APs 405a, 405b, and 405c transmits an NDP at the same time (such as during the same TTI). In some implementations, the APs 405a, 405b, and 405c synchronize transmission of the NDP based on the NDPA. For example, each AP 405a, 405b, and 405c may be configured to transmit the NDP after a fixed time interval (such as short interframe space (SIFS)) after receiving the NDPA. In some implementations, the APs 405a, 405b, and 405c synchronize transmission of the NDP via a backhaul. The STAs 415a and 415c may receive the NDPs.

In some implementations, the NDPs are multiplexed to avoid interference with each other. In particular, the LTFs of the NDPs from multiple APs may be multiplexed. In some implementations, the LTFs are multiplexed across APs using FDM. Further, in some implementations, every spatial stream belonging to the APs is multiplexed using FDM. For example, if there are N+M+X spatial streams, N belonging to the AP 405a, and M belonging to the AP 405b, and X belonging to the AP 405c, each N+M+X stream is transmitted on a different tone of each symbol where LTF is transmitted. Further, LTF is transmitted on N+M+X symbols. Therefore, each stream is transmitted on each tone. Therefore, each stream of each AP can be estimated on each tone.

In some implementations, NDP are multiplexed using FDM and a P-matrix. In some implementations, a P-matrix is an orthogonal code, with one dimension being spatial streams and the other being LTF symbols. Accordingly, in some implementations, the spatial streams of an individual AP are multiplexed using the P-matrix, but different APs transmit on non-overlapping tones for each LTF symbol. Further, LTF is transmitted on enough symbols for each AP to transmit on each tone.

In some implementations, NDP are multiplexed using only a P-matrix. In particular, the P-matrix may have a size to accommodate all spatial streams of all the APs 405a, 405b, and 405c.

In some implementations, NDP are multiplexed using TDM only, where each spatial stream is allocated to one LTF symbol and transmitted on all the tones of the LTF symbol.

In some implementations, NDP are multiplexed using TDM and a P-matrix. Accordingly, in some implementations, the spatial streams of an individual AP are multiplexed using the P-matrix, but different APs transmit on different LTF symbols (such as all the tones of the LTF symbol).

Further, after the APs 405a, 405b, and 405c transmit the NDP, one of the APs (such as the AP 405a) transmits a trigger request for feedback (such as channel feedback information) from each of the STAs 415a and 415c the NDP was transmitted to. For example, the trigger request may be transmitted after a fixed period (such as SIFS) after the NDP is transmitted. The trigger request from the AP 405a may therefore include identifiers of the STAs 415a and 415c. Since the trigger request sent from the AP 405a may identify the STAs associated with other APs, the trigger request may therefore identify STAs in BSS of the AP 405a and OBSSs of the AP 405a.

The STA 415a and 415c identified in the trigger request may send channel feedback information to the AP 405a based on the trigger request. As shown, the STAs 415a and 415c may transmit the channel feedback information in parallel (such as using uplink Orthogonal Frequency-Division Multiple Access (UL-OFDMA), UL MU-MIMO, etc.). However, in some implementations, the STAs may transmit the feedback information serially (such as sequentially). In some implementations, instead of the AP 405a sending a single trigger request for multiple STAs, the AP 405a may send multiple trigger requests (such as sequentially), one for each STA.

Further, the remaining APs 405b and 405c may transmit trigger requests and receive feedback from the STAs 415a and 415c as discussed. As shown, the APs transmit trigger requests and receive feedback information separately. However, in some implementations, the APs may transmit trigger requests and receive feedback information in parallel (such as using OFDMA, MIMO, etc.).

Based on the received channel feedback information, the APs 405a, 405b, and 405c may perform beamforming (such as by deriving steering matrices) and transmit data to the STAs 415a and 415c. In some implementations, the APs 405a, 405b, and 405c may transmit data after the sounding phase at a particular TTI, or in some implementations the AP 110a may send a trigger frame to indicate the TTI and coordinate the data transmission. As discussed, NDP from multiple APs 405a, 405b, and 405c may be synchronized through the backhaul or pre-corrected based on the received NDPA. Accordingly, in some implementations, for the distributed MU-MIMO data transmission to the STAs 415a and 415c, the APs 405a, 405b, and 405c may utilize the same frequency and time synchronization as used for the NDP to ensure proper beamforming. In some implementations, the transmit power backoff used by the APs may be kept constant between NDP and data transmission of the APs to ensure proper beamforming (such as prevent phase rotations).

In some implementations, the NDP transmitted from each AP 405a, 405b, and 405c may carry a preamble which is the same for all the APs 405a, 405b, and 405c. Such a preamble may be used by legacy devices that do not support distributed MU-MIMO to defer transmissions.

In some implementations, different APs may have different local oscillators. Therefore, there may be phase drift between the APs as they transmit NDP. Accordingly, for the STAs to determine when to listen for NDP, they may need to keep track of the phase drift of each AP. In some implementations, if transmissions from APs are multiplexed using FDM, phase tracking of the different APs may be performed by tracking the pilots for the different APs, which are transmitted on different tones. In some implementations, if transmission from APs are multiplexed using TDM, the symbol transmissions for different APs may be interleaved instead of the symbols for one AP being transmitted consecutively for better phase tracking (such as phase drift may change at different times so tracking drift over a longer period for each AP may be beneficial).

In some implementations, if transmission from APs are multiplexed using a P-matrix, non-overlapping tones may be assigned for transmission of different APs for phase tracking. Alternatively, multi-stream pilots may be used, where one stream per AP is transmitted on pilot tones to track the phase of each AP, or where the number of streams per AP transmitted on pilot tones is equal to the number of streams given to that AP for transmitting LTF.

Figure 5:
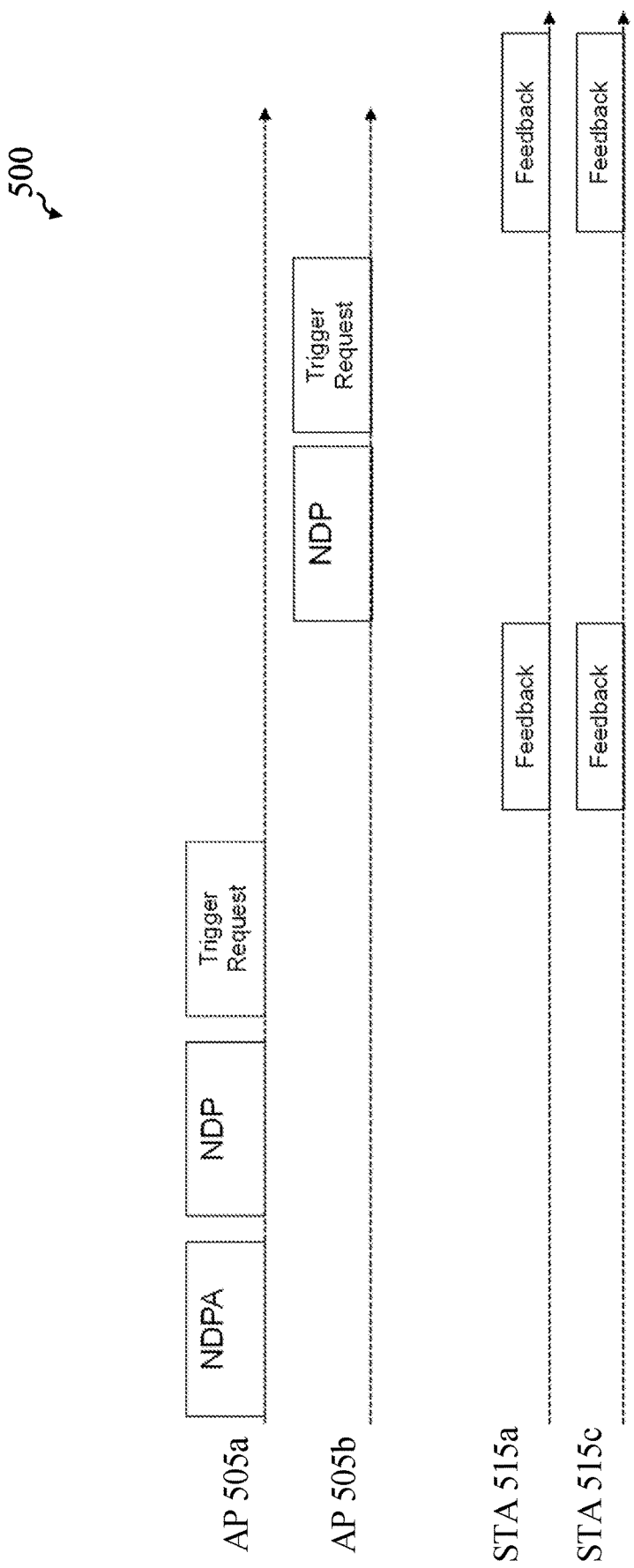
FIG. 5 illustrates a signal diagram of an example sequential sounding procedure for distributed MU-MIMO in accordance with aspects of the present disclosure.

FIG. 5 illustrates a signal diagram 500 of an example sequential sounding procedure for distributed MU-MIMO. In some implementations, initially, any one of the APs (here shown as AP 505a) transmits a NDPA as described with respect to FIG. 4. The AP 505a then alone transmits a NDP to the STAs 515a and 515c. Continuing the example, AP 505a transmits one or more trigger requests requesting feedback to the STAs 515a and 515c as discussed. The STAs 515a and 515c then, serially or in parallel, transmit channel feedback information to the AP 505a. After the STAs 515a and 515c transmit the channel feedback information to the AP 505a, the AP 505b alone transmits a NDP to the STAs 515a and 515c, transmits one or more trigger requests requesting feedback, and receives channel feedback information. Accordingly, a single NDPA is transmitted for starting a sounding procedure for multiple APs, but the NDP are transmitted sequentially.

In some implementations, though not shown, for sequential sounding procedure, instead of one AP transmitting one NDPA for transmission of multiple NDPs by multiple APs, each AP may sequentially transmit a NDPA and perform the sounding procedure. Accordingly, each AP transmits its own NDPA before transmitting NDP sequentially (such as shown in FIG. 5).

In both such sequential sounding procedures, the NDPA may still identify STAs associated with other APs than the transmitting AP, and the NDPA may therefore identify STAs in BSS of the transmitting AP and OBSS of the transmitting AP. Further, the trigger request sent from the transmitting AP may still identify STAs associated with other APs, and the trigger request may therefore identify STAs in BSS of the transmitting AP and OBSS of the transmitting AP.

In some implementations, the transmit power backoff used by the APs may be kept constant between NDP and data transmission of the APs to ensure proper beamforming (such as prevent phase rotations). Further, in some implementations, for sequential sounding procedure, the RxAGC at the STAs may be kept constant between when one AP sounds and another AP sounds to prevent gain offsets. In some implementations, the NDPA may (such as implicitly) indicate to the STAs to keep RxAGC constant.

As discussed, in distributed MU-MIMO, a plurality of APs may coordinate beamforming. To do so, in some implementations, a group of APs is formed to perform distributed MU-MIMO. In some implementations, the group of APs may be formed through exchanging information over a backhaul. In some implementations the group of APs may be formed through exchanging information over the air. For example, one AP may invite other APs to join a distributed MU-MIMO transmission and exchange frames with the other APs to form a group.

Figure 6:
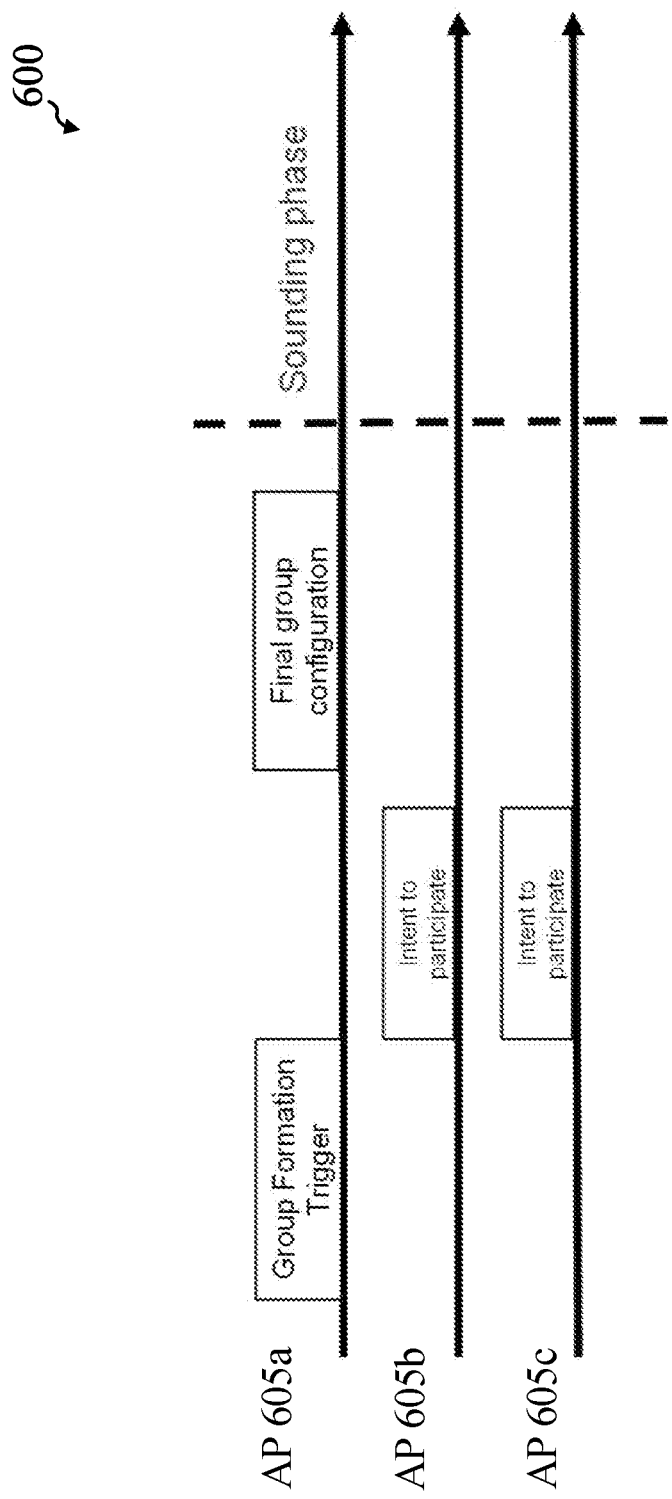
FIG. 6 illustrates a signal diagram of an example over the air group formation procedure for distributed MU-MIMO in accordance with aspects of the present disclosure.

FIG. 6 illustrates a signal diagram 600 of an example over the air group formation procedure for distributed MU-MIMO.

Initially, an AP (in this example the AP 605a) transmits a group formation trigger. For example, if the AP 605a is scheduled to make a DL MU-MIMO transmission and is not using all available spatial streams at the AP 605a to make the transmission, the AP 605a may transmit a group formation trigger so other APs can use the remaining spatial streams. The group formation trigger may include the number of streams the AP 605a has available for additional transmissions.

Neighboring APs (in this example the APs 605b and 605c) to the AP 605a may receive the group formation trigger, and determine whether they will join the AP 605a in a distributed MU-MIMO transmission. For example, any neighboring APs with data to transmit may determine to join the group with the AP 605a. For the neighboring APs 605b and 605c that determine to join the group, each transmits an intent to participate to the AP 605a. The intent to participate may include, for example, a list of STAs that that the given AP wants data transmitted to in the distributed MU-MIMO transmission. Further, the intent to participate may include, for example, a number of spatial streams desired for transmission per STA. In some implementations, the APs transmit the intent to participate in parallel using open loop MU-MIMO (similar to uplink MU-MIMO) or using UL-OFDMA.

The AP 605a may receive the intent to participate, determine the group, and perform the sounding phase and distributed MU-MIMO transmission, such as utilizing the techniques described herein. In some implementations, if the AP receives intents to participate requesting more spatial streams than the AP 605a has available, the AP 605a may choose which APs to include in the group and which streams to allocate to which APs.

In some implementations, before performing the sounding phase and after the AP 605a receives the intent to participate, the AP 605a may transmit a final group configuration. The final group configuration may include a listing of the APs included in the group. Further, in some implementations, the final group configuration indicates which spatial streams are allocated to which APs (such as by mapping AP identifiers or identifiers of the APs to stream indices). In some implementations, the final group configuration may include a listing of the STAs (such as identifiers of the STAs) that the group of APs will send distributed transmissions. Further, in some implementations, the final group configuration indicates which spatial streams or number of spatial streams are allocated to which STAs (such as by mapping STA identifiers or the identifiers of the STAs to stream indices). In some implementations, instead of the final group configuration being sent by the AP 605a, the information is included in a NDPA as discussed in a sounding phase.

Figure 7:
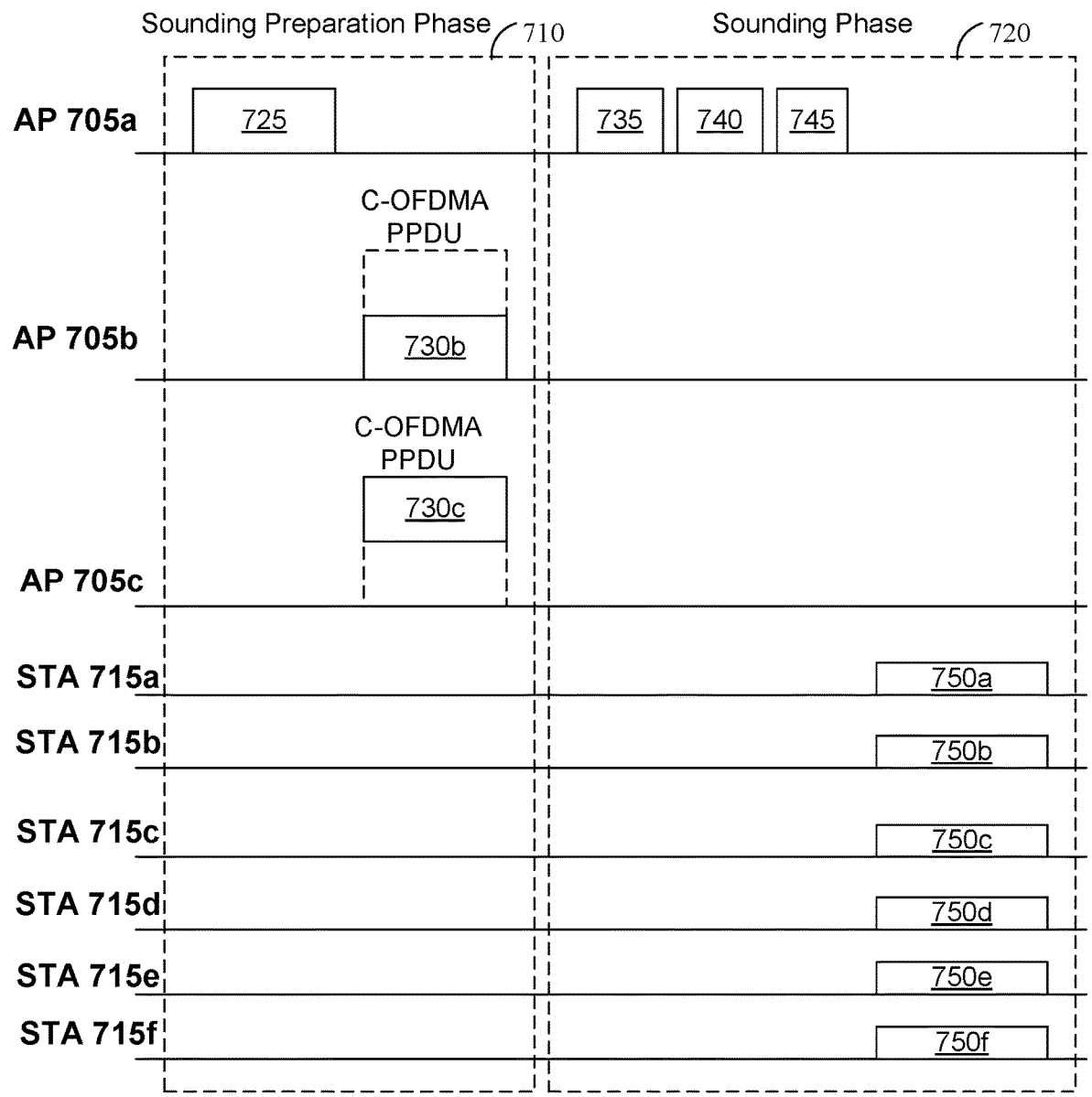
FIG. 7 illustrates a signal diagram of a sounding procedure for distributed MU-MIMO with a sounding preparation phase and a sounding phase in accordance with aspects of the present disclosure.

FIG. 7 illustrates a signal diagram 700 of an example of a sounding procedure for distributed MU-MIMO, in accordance with aspects of the present disclosure. According to some aspects, the sounding procedure for distributed MU-MIMO may comprise a sounding preparation phase 710 and a sounding phase 720. The sounding procedure may obtain channel feedback information for use in a subsequent beamformed distributed MU-MIMO transmission of data from a plurality of APs 705a, 705b, and 705c, to a group of STAs 715a through 715f in different BSSs. For instance, STAs 715a and 715b may be associated with AP 705a, STAs 715c and 715d may be associated with AP 705b, and STAs 715e and 715f may be associated with AP 705c. In some aspects, the sounding preparation phase 710 may identify which stations from the different BSSs will participate in the sounding phase 720.

In some aspects, an initiating AP, such as the AP 705a, generates and transmits at least one first frame 725 to neighboring OBSS APs, such as the APs 705b and 705c, during the sounding preparation phase 710. The first frame 725 may invite the neighboring OBSS APs to perform a beamformed distributed transmission from the plurality of APs 705a, 705b, and 705c to the group of STAs 715a through 715f. For example, the first frame 725 may be a trigger frame, such as a multi-AP sounding initiate trigger frame. In some aspects, the first frame 725 may include an identifier such as a basic service set identifier (BSSID) of the initiating AP 705a. In some aspects, the first frame 725 may include an identifier, such as a BSSID, of each of the neighboring OBSS APs 705b and 705c. For each BSSID of the APs 705b and 705c, the first frame 725 may include a set of unique, temporary identifiers for subsequent allocation to STAs that will participate in the sounding phase 720. In some aspects, the first frame 725 may include at least one temporary identifier to be used as a replacement to an association identifier (AID) of each STA that will participate in the sounding phase. Each temporary identifier may be unique across all of the BSSs such that none of the STAs have a same identifier. The set of unique identifiers may also be temporary such that they are used only for a specific duration, such as during only one sounding phase 720 and not during subsequent sounding phases. However, other specific durations for the unique, temporary identifiers may be used. By using identifiers that are unique and temporary, a secure technique may be provided to identify STAs during the sounding procedure.

According to some aspects, in response to receiving the first frame 725 from the initiating AP 705a, each of the neighboring OBSS APs 705b and 705c may generate and transmit a second frame 730b and 730c, respectively, during the sounding preparation phase 710. In some aspects, the second frames 730b and 730c may be transmitted at a same time. For example, the second frames 730b and 730c may be transmitted in a coordinated-OFDMA PPDU (C-OFDMA PPDU). In some aspects, each of the second frames 730b and 730c may include the BSSID of the AP 705b and 705c, respectively, from which it is transmitted. Each of the second frames 730b and 730c may also include the BSSIDs of the neighboring OBSS APs. In some aspects, each of the second frames 730b and 730c may include a BSSID of the initiating AP 705a. In some aspects, the neighboring OBSS APs 705b and 705c may identify which of the STAs in its own BSS will participate in the sounding phase 720 since each of the APs 705b and 705c has updated buffer status information for STAs in its own BSS. For example, each of the neighboring OBSS APs 705b and 705c may identify which of the STAs associated to each has traffic for transmission during the beamformed distributed transmission. Each of the second frames 730b and 730c may include one or more identifiers of corresponding STAs that will participate in the sounding phase 720 and the beamformed distributed transmission. For instance, the second frame 730b may include identifiers of STAs 715c and 715d in the BSS of AP 705b; and the second frame 730c may include identifiers of STAs 715e and 715f in the BSS of AP 705c.

In some aspects, each of the neighboring OBSS APs 705b and 705c may transmit the second frames 730b and 730c, respectively, to the initiating AP 705a. For example, each of the second frames 730b and 730c may comprise a response frame, such as a multi-AP sounding response frame. In some aspects, each of the second frames 730b and 730c may be included in a trigger-based PPDU (TB PPDU), such as a high efficiency TB PPDU (HE TB PPDU). In some aspects, the one or more identifiers of the STAs included in the second frames 730b and 730c may comprise an association identifier (AID) of each of the STAs 715c, 715d, 715e, and 715f. In some aspects, each AID may comprise a temporary AID of the STAs that will participate in the beamformed distributed transmission. For example, the temporary AID may comprise one of the unique identifiers included in the first frame 725. In some aspects, the one or more identifiers of the STAs may each comprise a color code of the AP (that is associated with the STA) appended to the AID of the STA. After receiving the second frames 730b and 730c, the initiating AP 705a may use the one or more identifiers of the STAs during the sounding phase 720.

In some aspects, the neighboring OBSS APs may transmit the second frames 730b and 730c to the STAs identified to participate in the sounding phase 720. For example, the second frames 730b and 730c may each comprise a setup frame, such as a multi-AP sounding setup frame. For instance, the AP 705b may transmit the second frame 730b to the STAs 715c and 715d in its BSS that were identified for participation in the sounding phase 720; and the AP 705c may transmit the second frame 730c to the STAs 715e and 715f in its BSS that were identified for participation in the sounding phase 720. In some aspects, each of the second frames 730b and 730c may be included in a multi-user physical layer protocol data unit (MU PPDU), such as a high efficiency MU PPDU (HE MU PPDU). A preamble of the MU PPDU may be common for the PPDUs transmitted by the neighboring OBSS APs. The MU PPDU may include a signal field, such as a SIG-B field, that contains an RU allocation for each AP identifier, such as a BSS color. The MU PPDU may be transmitted in a short interframe space (SIFS) response to the first frame 725. Each of the neighboring OBSS APs 705b and 705c may transmit the second frames 730b and 730c, respectively, in an RU to which it is allocated. The initiating AP may receive the MU PPDU from at least a subset of the plurality of access points, such as the neighboring OBSS APs 705b and 705c, with resource allocation configured on a per basic service set basis In some aspects, if the first frame 720 included a set of temporary identifiers, each of the APs 705b and 705c may map the temporary identifiers associated with its BSSID to media access control (MAC) addresses of the STAs in its BSS that have been identified for participation in the sounding phase 720. The one or more identifiers in the second frames 730b and 730c may comprise one or more of the unique identifiers from the first frame 720. Furthermore, each of the second frames 730b and 730c may include a mapping of the unique identifiers to the MAC addresses of the STAs identified for participation in the sounding phase 720. In some aspects, the temporary identifiers may be used to replace AIDs of the STAs identified for participation in the sounding phase. When each of the STAs 715c, 715d, 715e, and 715f receive the second frames 730, and 730c, it may identify its MAC address and store the unique identifier mapped to its MAC address for use in the sounding phase 720. In some aspects, each of the STAs 715c, 715d, 715e, and 715f may store the BSSID of the initiating AP 705a for use in the sounding phase 720. In some aspects, the initiating AP may receive the second frames 730b and 730c.

According to some aspects, based on the second frames 730b and 730c received from the neighboring OBSS APs 705b and 705c, the initiating AP 705a can form the group of STAs 715a through 715f and commence the sounding phase 720. Specifically, the initiating AP 705a may identify STAs 715a and 715b in its own BSS that will participate in the sounding phase 720 because they have traffic for transmission during the beamformed distributed transmission. In addition, the initiating AP 705a receives from the second frames 730b and 730c, the identifiers of the STAs 715c, 715d, 715e, and 715f in the neighboring OBSSs that will participate in the sounding phase 720. The initiating AP 705a may form the group of STAs 715a through 715f for the sounding phase 720 and may initiate the sounding phase 720 by transmitting an announcement frame, such as a null data packet announcement (NDPA) 735, to at least a subset of the group of STAs 715a through 715f for performing a channel sounding procedure for the beamformed distributed transmission. In some aspects, the neighboring OBSS APs 705b and 705c may transmit the announcement frame to a rest of the group of STAs that are not part of the subset. In some aspects, the initiating AP 705a transmits the announcement frame to each STA in the group of STAs 715a through 715f.

In some aspects, the initiating AP 705a may include in the announcement frame the identifiers of each of the STAs 715a through 715f in the group. The announcement frame may include the identifiers of the STAs 715a through 715f, such as the unique identifiers, the temporary identifiers, the AIDs, the AP color codes appended to the AIDs, or a combination thereof. In some aspect, the identifiers may be included in a station information field of the NDPA 735. In some aspects, the identifiers may be included in an Extreme High Throughput (EHT) field of the NDPA 735 to be defined by the IEEE 802.11be standard. At least the subset of the group of STAs 715a through 715f may listen to the NDPA 735 with transmitter address filtering allowing decoding and processing of sounding packets from the BSSID of the initiating AP 705a.

After transmission of the announcement frame, the initiating AP 705a may transmit a packet for channel sounding, such as a null data packet (NDP) 740, to at least the subset of the group of STAs 715a through 715f. After transmission of the packet for channel sounding, the initiating AP 705a may transmit a trigger frame 745 for soliciting feedback information to at least the subset of the group of STAs 715a through 715f. In some aspects, the trigger frame 745 may include the identifiers of the STAs 715a through 715f, such as the unique identifiers, the temporary identifiers, the AIDs, the AP color codes appended to the AIDs, or a combination thereof. Based on receiving the NDP 740 and/or the trigger frame 745, at least the subset of the group of STAs 715a through 715f may transmit the feedback information to the initiating AP 705a, such as in uplink MU packets 750a through 715f. After receiving the feedback information from at least the subset of the group of STAs 715a through 715f, the initiating AP 705a may transmit to the group of stations 715a through 715f the beamformed distributed transmission along with the APs 705b and 705c.

According to some aspects, after receiving the identifiers of the STAs 715a through 715f in the second frames 730b and 730c, the initiating AP 705a may transmit to at least the subset of the group of STAs 715a through 715f, an MU PPDU, such as an HE MU PPDU or downlink MU PPDU (DL MU PPDU). The MU PPDU may include a BSS color value identifying the initiating AP 705a. In some aspects, the BSS color value may comprise a common BSS color pre-negotiated among the plurality of access points for initiating a sounding procedure, which may eliminate a need for the STAs 715a through 715f to parse through every PPDU that is sent by each of the plurality of APs 705a, 705b, and 705c. In some aspects, the BSS color may be zero, which may require each of the STAs 715a through 715f to parse through every PPDU. In some aspects, the BSS color value may comprise a BSS color of the initiating AP 705a.

According to some aspects, the MU PPDU may include at least one station information field may contain identifiers of the initiating AP 705a and the neighboring OBSS APs 705b and 705c. The at least one station information field may be included in a signal field, such as the SIG-B field, of the MU PPDU. In some aspects, an identifier of the initiating AP 705a may be zero, and the identifiers of the neighboring OBSS APs 705b and 705c may comprise values from 1 to n−1. In some aspects, the identifiers of the plurality of APs 705a, 705b, and 705c may comprise values from m to m+k−1. The values of the identifiers may be unassigned to STAs 715a through 715f associated with the plurality of APs 705a, 705b, and 705c. The identifiers may comprise reserved values of AIDs, such as the values ranged from 2008 to 2044.

According to some aspects, the MU PPDU may include a plurality of physical layer service data units (PSDUs). The PSDUs may each contain a frame, such as a trigger frame, that targets one of the STAs 715a through 715f and that includes one of the identifiers of the STAs 715a through 715f. Each trigger frame has AIDs that uniquely identify a STA that is associated to the neighboring AP that is identified by the STA identifier in the SIG-B field of the particular RU that contains the PSDU. Each of the plurality of APs 705a, 705b, and 705c may exchange with the rest of the plurality of APs, a list of the STAs 715a through 715f that are associated with it such that each neighboring OBSS AP may become the initiating AP.

Figure 8:
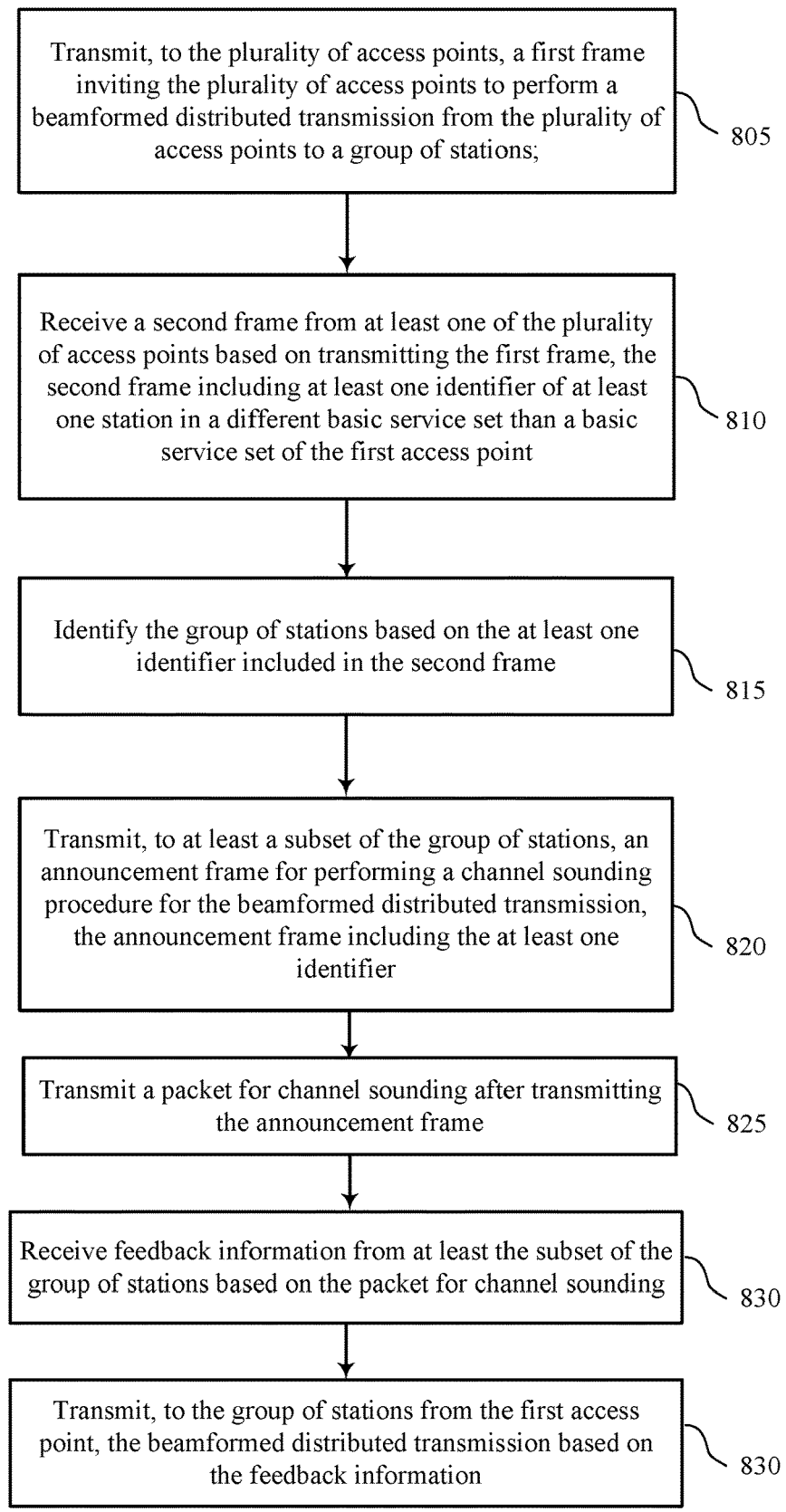
FIG. 8 illustrates example operations for performing a sounding preparation phase of a sounding procedure for distributed MU-MIMO in accordance with aspects of the present disclosure.

FIG. 8 illustrates example operations 800 for performing a sounding procedure with a sounding preparation phase for distributed MU-MIMO in accordance with various aspects of the present disclosure. The operations 800 may be implemented by an access point (e.g., AP 705a), a first access point, an initiating access point, a receiving access point, a neighboring OBSS access point, a plurality of access points, a station, an initiating station, a receiving station, a wireless device, a wireless node, an apparatus, a wireless modem, a chipset, a system, and any other suitable device. Although the operations 800 are described herein with reference to a particular order, in various examples, blocks herein may be performed in a different order, or omitted, and additional blocks may be added.

At 805, a first frame is transmitted to the plurality of access points, the first frame inviting the plurality of access points to perform a beamformed distributed transmission from the plurality of access points to a group of stations.

At 810, a second frame is received from at least one of the plurality of access points based on transmitting the first frame, the second frame including at least one identifier of at least one station in a different basic service set than a basic service set of the first access point.

At 815, the group of stations is identified based on the at least one identifier included in the second frame.

At 820, an announcement frame, such as an NDPA, is transmitted to at least a subset of the group of stations for performing a channel sounding procedure for the beamformed distributed transmission, the announcement frame including the at least one identifier.

At 825, a packet for channel sounding, such as an NDP, is transmitted after transmitting the announcement frame.

At 830, the beamformed distributed transmission is transmitted to the group of stations from the first access point based on the feedback information.

Figure 9:
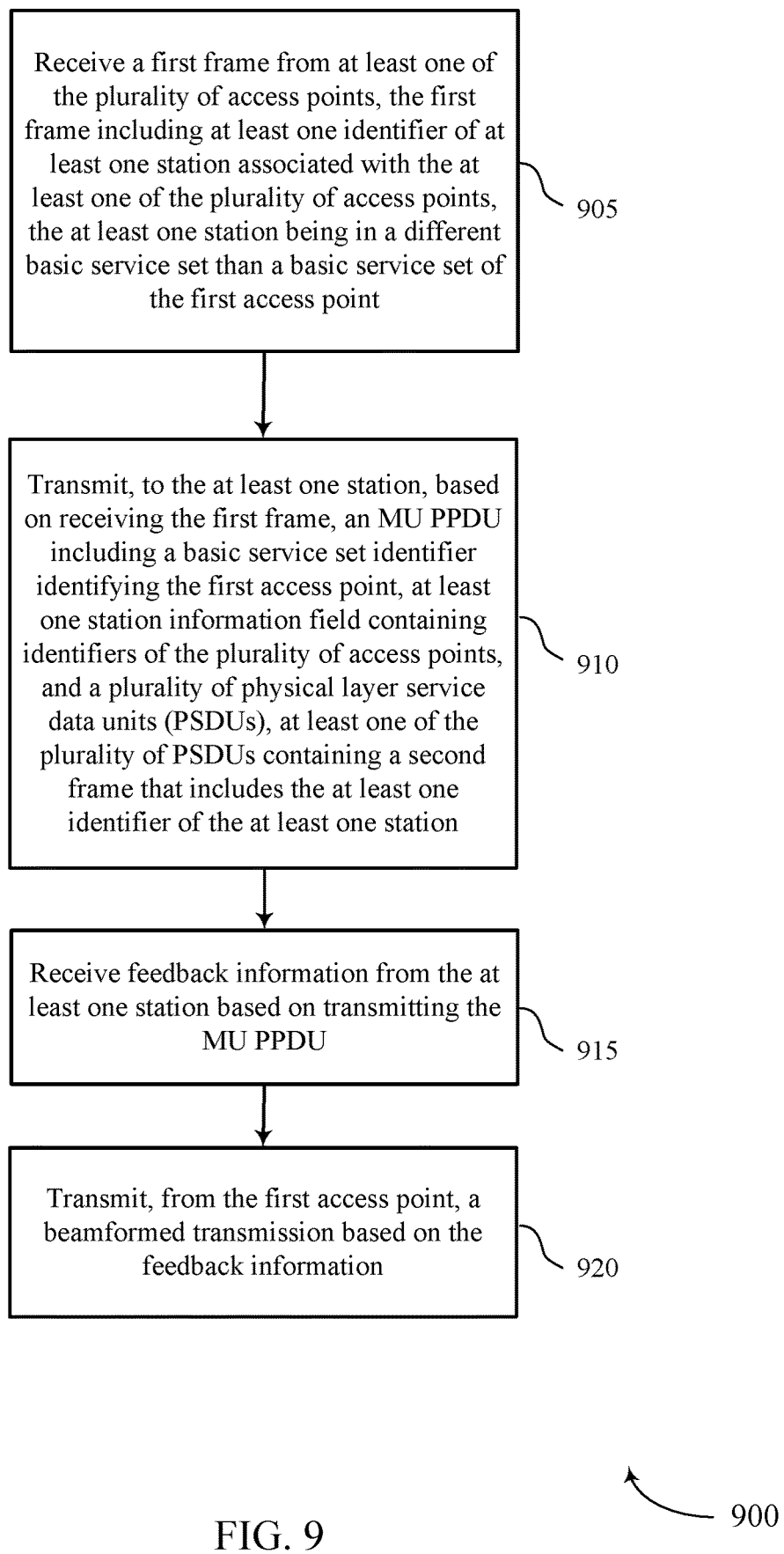
FIG. 9 illustrates example operations for performing a sounding preparation phase of a sounding procedure for distributed MU-MIMO in accordance with aspects of the present disclosure.

FIG. 9 illustrates example operations 900 for performing a sounding procedure with a sounding preparation phase for distributed MU-MIMO in accordance with various aspects of the present disclosure. The operations 900 may be implemented by an access point (e.g., AP 705a in FIG. 7), a first access point, an initiating access point, a receiving access point, a neighboring OBSS access point, a plurality of access points, a station, an initiating station, a receiving station, a wireless device, a wireless node, an apparatus, a wireless modem, a chipset, a system, and any other suitable device. Although the operations 900 are described herein with reference to a particular order, in various examples, blocks herein may be performed in a different order, or omitted, and additional blocks may be added.

At 905, a first frame is received from at least one of the plurality of access points, the first frame including at least one identifier of at least one station associated with the at least one of the plurality of access points, the at least one station being in a different basic service set than a basic service set of the first access point.

At 910, an MU PPDU is transmitted to the at least one station based on receiving the first frame, the MU PPDU including a basic service set color value identifying the first access point, at least one station information field containing identifiers of the plurality of access points, and a plurality of PSDUs, at least one of the plurality of PSDUs containing a second frame that includes the at least one identifier of the at least one station.

At 915, feedback information is received from the at least one station based on transmitting the MU PPDU.

At 920, a beamformed transmission is transmitted based on the feedback information.

Figure 10:
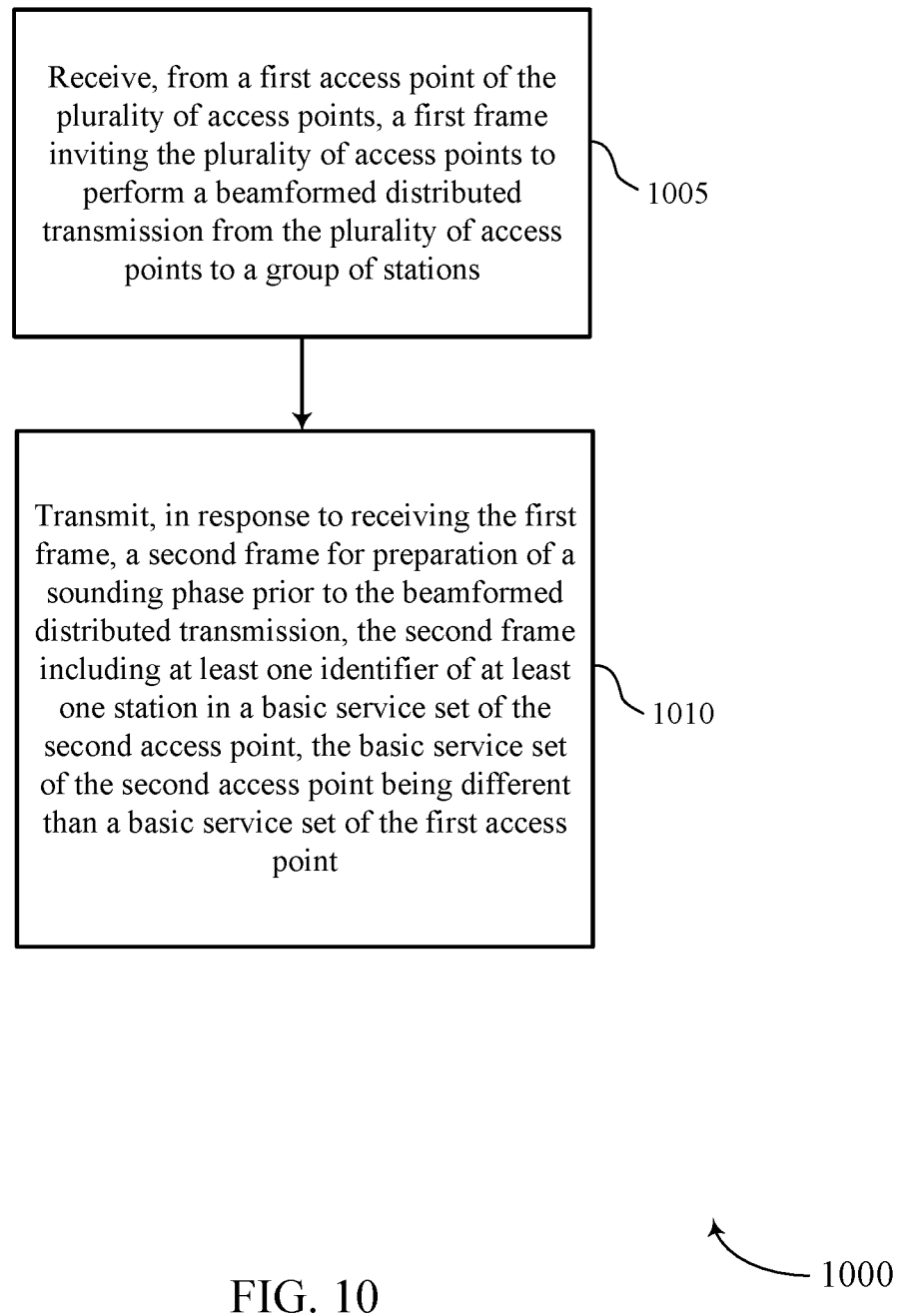
FIG. 10 illustrates example operations for performing a sounding preparation phase of a sounding procedure for distributed MU-MIMO in accordance with aspects of the present disclosure.

FIG. 10 illustrates example operations 1000 for performing a sounding procedure with a sounding preparation phase for distributed MU-MIMO in accordance with various aspects of the present disclosure. The operations 1000 may be implemented by an access point (e.g., AP 705b or AP 705c in FIG. 7), a second access point, a receiving access point, a first access point, an initiating access point, a neighboring OBSS access point, a plurality of access points, a station, an initiating station, a receiving station, a wireless device, a wireless node, an apparatus, a wireless modem, a chipset, a system, and any other suitable device. Although the operations 1000 are described herein with reference to a particular order, in various examples, blocks herein may be performed in a different order, or omitted, and additional blocks may be added.

At 1005, a first frame is received from a first access point of the plurality of access points, the first frame inviting the plurality of access points to perform a beamformed distributed transmission from the plurality of access points to a group of stations.

At 1010, in response to receiving the first frame, a second frame is received for preparation of a sounding phase prior to the beamformed distributed transmission, the second frame including at least one identifier of at least one station in a basic service set of the second access point, the basic service set of the second access point being different than a basic service set of the first access point.

Figure 11:
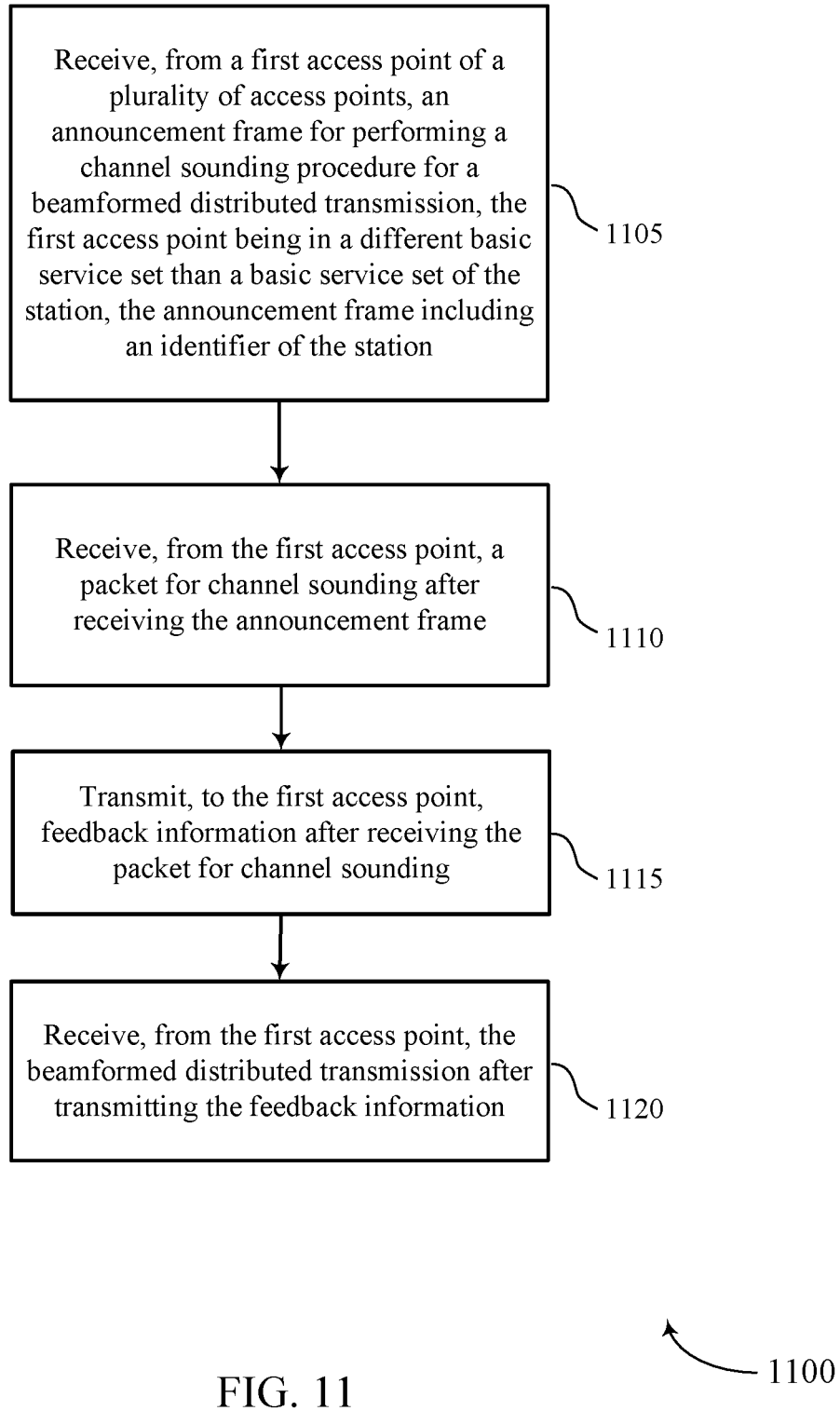
FIG. 11 illustrates example operations for performing a sounding preparation phase of a sounding procedure for distributed MU-MIMO in accordance with aspects of the present disclosure.

FIG. 11 illustrates example operations 1100 for performing a sounding procedure with a sounding preparation phase for distributed MU-MIMO in accordance with various aspects of the present disclosure. The operations 1100 may be implemented by a station (e.g., any of STAs 715a through 715f in FIG. 7), an initiating station, a receiving station, an access point, a second access point, a receiving access point, a first access point, an initiating access point, a neighboring OBSS access point, a plurality of access points, a wireless device, a wireless node, an apparatus, a wireless modem, a chipset, a system, and any other suitable device. Although the operations 1100 are described herein with reference to a particular order, in various examples, blocks herein may be performed in a different order, or omitted, and additional blocks may be added.

At 1105, an announcement frame, such as an NDPA, for performing a channel sounding procedure for a beamformed distributed transmission is received from a first access point of a plurality of access points, the first access point being in a different basic service set than a basic service set of the station, the announcement frame including an identifier of the station.

At 1110, a packet for channel sounding, such as an NDP, is received from the first access point after receiving the announcement frame.

At 1115, feedback information is transmitted to the first access point after receiving the packet for channel sounding.

At 1120, the beamformed distributed transmission is received from the first access point after transmitting the feedback information.

In addition to the various aspects described above, aspects of specific combinations are within the scope of the disclosure, some of which are detailed below:

Aspect 1: A method for wireless communications at a first access point of a plurality of access points, comprising: transmitting, to the plurality of access points, a first frame inviting the plurality of access points to perform a beamformed distributed transmission from the plurality of access points to a group of stations; receiving a second frame from at least one of the plurality of access points based on transmitting the first frame, the second frame including at least one identifier of at least one station in a different basic service set than a basic service set of the first access point; identifying the group of stations based on the at least one identifier included in the second frame; transmitting, to at least a subset of the group of stations, an announcement frame for performing a channel sounding procedure for the beamformed distributed transmission, the announcement frame including the at least one identifier; transmitting a packet for channel sounding after transmitting the announcement frame; receiving feedback information from at least the subset of the group of stations based on the packet for channel sounding; and transmitting, to the group of stations from the first access point, the beamformed distributed transmission based on the feedback information.

Aspect 2: The method of Aspect 1, wherein the first frame includes an identifier of each of the plurality of access points.

Aspect 3: The method of any one of Aspects 1-2, wherein the first frame includes a temporary identifier to be used as a replacement to an association identifier (AID) for the at least one station in the different basic service set than the basic service set of the first access point.

Aspect 4: The method of Aspect 3, wherein the at least one identifier included in the second frame comprises the temporary identifier.

Aspect 5: The method of any of Aspects 1-4, wherein the second frame includes a mapping of the at least one identifier to a media access control (MAC) address of the at least one station.

Aspect 6: The method of any of Aspects 1-5, wherein the second frame is included in a multi-user physical layer protocol data unit (MU PPDU) received from at least a subset of the plurality of access points with resource allocation configured on a per basic service set basis.

Aspect 7: The method of any of Aspects 1-6, wherein the second frame includes an identifier of the first access point.

Aspect 8: The method of any of Aspects 1-7, wherein the second frame includes an identifier of the at least one of the plurality of access points.

Aspect 9: The method of any of Aspects 1-8, wherein the at least one identifier comprises an association identifier (AID) of the at least one station.

Aspect 10: The method of any of Aspects 1-9, wherein the second frame is included in a trigger-based physical layer protocol data unit (TB PPDU) received by the first access point.

Aspect 11: The method of Aspect 9, wherein the AID of the at least one station comprises a temporary identifier allocated by the at least one of the plurality of access points.

Aspect 12: The method of any of Aspects 1-11, wherein the announcement frame includes a basic service set color code of the at least one of the plurality of access points appended to the at least one identifier.

Aspect 13: The method of Aspect 12, wherein the at least one identifier and the basic service set color code are included in a station information field of the announcement frame.

Aspect 14: The method of Aspect 12, wherein the at least one identifier and the basic service set color code are included in an Extreme High Throughput (EHT) field of the announcement frame.

Aspect 15: The method of any of Aspects 1-14, wherein the announcement frame comprises a Null Data Packet Announcement (NDPA), wherein the packet for channel sounding comprises a Null Data Packet (NDP), and the method further comprises transmitting, to at least the subset of the group of stations, a trigger frame for soliciting the feedback information after transmitting the NDP.

Aspect 16: The method of Aspect 15, wherein the trigger frame includes a color code of the at least one of the plurality of access points appended to the at least one identifier.

Aspect 17: A method for wireless communications by a first access point of a plurality of access points, comprising: receiving a first frame from at least one of the plurality of access points, the first frame including at least one identifier of at least one station associated with the at least one of the plurality of access points, the at least one station being in a different basic service set than a basic service set of the first access point; transmitting, to the at least one station, based on receiving the first frame, a multi-user physical layer protocol data unit (MU PPDU) including a basic service set identifier identifying the first access point, at least one station information field containing identifiers of the plurality of access points, and a plurality of physical layer service data units (PSDUs), at least one of the plurality of PSDUs containing a second frame that includes the at least one identifier of the at least one station; receiving feedback information from the at least one station based on transmitting the MU PPDU; and transmitting, from the first access point, a beamformed distributed transmission based on the feedback information.

Aspect 18: The method of Aspect 17, wherein the at least one station information field is included in a signal field of the MU PPDU.

Aspect 19: The method of any of Aspects 17-18, wherein the basic service set identifier comprises a common basic service set color pre-negotiated among the plurality of access points for initiating a sounding procedure.

Aspect 20: The method of any of Aspects 17-19, wherein the basic service set identifier is zero.

Aspect 21: The method of any of Aspects 17-20, wherein the basic service set identifier is a basic service set color of the first access point.

Aspect 22: The method of any of Aspects 17-21, wherein the basic service set identifier of the first access point is zero, and wherein the identifiers of the plurality of access points comprise values from 1 to n−1.

Aspect 23: The method of any of Aspects 17-22, wherein the identifiers of the plurality of access points comprise values from m to m+k−1.

Aspect 24: The method of Aspect 23, wherein the values of the identifiers are unassigned to stations associated with the plurality of access points.

Aspect 25: The method of any of Aspects 17-24, wherein the identifiers comprise reserved values of association identifiers.

Aspect 26: A method for wireless communications by a second access point of a plurality of access points, comprising: receiving, from a first access point of the plurality of access points, a first frame inviting the plurality of access points to perform a beamformed distributed transmission from the plurality of access points to a group of stations; and transmitting, in response to receiving the first frame, a second frame for preparation of a sounding phase prior to the beamformed distributed transmission, the second frame including at least one identifier of at least one station in a basic service set of the second access point, the basic service set of the second access point being different than a basic service set of the first access point.

Aspect 27: The method of Aspect 26, wherein the first frame includes an identifier of each of the plurality of access points.

Aspect 28: The method of any of Aspects 26-27, wherein the first frame includes a temporary identifier to be used as a replacement to an association identifier (AID) for the at least one station in the basic service set of the second access point.

Aspect 29: The method of Aspect 28, wherein the at least one identifier included in the second frame comprises the temporary identifier.

Aspect 30: The method of any of Aspects 26-29, wherein the second frame includes a mapping of the at least one identifier to a media access control (MAC) address of the at least one station.

Aspect 31: The method of Aspect 30, wherein the second frame is included in a multi-user physical layer protocol data unit (MU PPDU) transmitted to the at least one station with resource allocation configured on a per basic service set basis.

Aspect 32: The method of any of Aspects 26-31, wherein the second frame includes an identifier of the first access point.

Aspect 33: The method of any of Aspects 26-32, wherein the second frame includes an identifier of the second access point.

Aspect 34: The method of any of Aspects 26-33, wherein the at least one identifier comprises an association identifier (AID) of the at least one station.

Aspect 35: The method of any of Aspects 26-34, wherein the second frame is included in a trigger-based physical layer protocol data unit (TB PPDU) transmitted to the first access point.

Aspect 36: The method of Aspect 34, wherein the AID of the at least one station comprises a temporary identifier allocated by the second access point.

Aspect 37: The method of Aspect 34, wherein the at least one identifier comprises a color code of the second access point appended to the AID of the at least one station.

Aspect 38: The method of any of Aspects 26-37, further comprising receiving, from a third access point of the plurality of access points, a third frame for preparation of the sounding phase prior to the beamformed distributed transmission, the third frame including at least one identifier of at least one station in a different basic service set than the basic service set of the second access point.

Aspect 39: The method of Aspect 38, further comprising: identifying the group of stations based on the at least one identifier included in the third frame; transmitting, to at least a subset of the group of stations, an announcement frame for performing a channel sounding procedure for the beamformed distributed transmission, the announcement frame including the at least one identifier included in the third frame; transmitting a packet for channel sounding after transmitting the announcement frame; receiving feedback information from at least the subset of the group of stations based on the packet for channel sounding; and transmitting, to the group of stations from the second access point, the beamformed distributed transmission based on the feedback information.

Aspect 40: A method for wireless communications by a station, comprising: receiving, from a first access point of a plurality of access points, an announcement frame for performing a channel sounding procedure for a beamformed distributed transmission, the first access point being in a different basic service set than a basic service set of the station, the announcement frame including an identifier of the station; receiving, from the first access point, a packet for channel sounding after receiving the announcement frame; transmitting, to the first access point, feedback information after receiving the packet for channel sounding; and receiving, from the first access point, the beamformed distributed transmission after transmitting the feedback information.

Aspect 41: The method of Aspect 40, further comprising receiving, prior to receiving the announcement frame, a first frame from a second access point associated with the station, the first frame including the identifier of the station.

Aspect 42: The method of Aspect 41, wherein the first frame includes an identifier of each of the plurality of access points.

Aspect 43: The method of Aspect 41, wherein the first frame includes a mapping of the identifier to a media access control (MAC) address of the station.

Aspect 44: The method of Aspect 41, wherein the first frame is included in a multi-user physical layer protocol data unit (MU PPDU) received from at least a subset of the plurality of access points with resource allocation configured on a per basic service set basis.

Aspect 45: The method of any of Aspects 40-44, wherein the identifier comprises a unique, temporary identifier.

Aspect 46: The method of any of Aspects 40-45, wherein the identifier comprises an association identifier (AID) of the station.

Aspect 47: The method of any of Aspects 40-46, wherein the identifier comprises a color code of the second access point appended to an AID of the station.

Aspect 48: The method of any of Aspects 40-47, wherein the announcement frame includes a color code of the second access point appended to the identifier.

Aspect 49: The method of Aspect 48, wherein the identifier and the color code are included in a station information field of the announcement frame.

Aspect 50: The method of Aspect 48, wherein the identifier and the color code are included in an Extreme High Throughput (EHT) field of the announcement frame.

Aspect 51: The method of any of Aspects 40-50, wherein the announcement frame comprises a Null Data Packet Announcement (NDPA), wherein the packet for channel sounding comprises a Null Data Packet (NDP), and the method further comprises receiving, from the first access point, a trigger frame for soliciting the feedback information after receiving the NDP.

Aspect 52: The method of Aspect 51, wherein the trigger frame includes a color code of the second access point appended to the at least one identifier.

Aspect 53: A first access point of a plurality of access points, comprising: means for transmitting, to the plurality of access points, a first frame inviting the plurality of access points to perform a beamformed distributed transmission from the plurality of access points to a group of stations; means for receiving a second frame from at least one of the plurality of access points based on transmitting the first frame, the second frame including at least one identifier of at least one station in a different basic service set than a basic service set of the first access point; means for identifying the group of stations based on the at least one identifier included in the second frame; means for transmitting, to at least a subset of the group of stations, an announcement frame for performing a channel sounding procedure for the beamformed distributed transmission, the announcement frame including the at least one identifier; means for transmitting a packet for channel sounding after transmitting the announcement frame; means for receiving feedback information from at least the subset of the group of stations based on the packet for channel sounding; and means for transmitting, to the group of stations from the first access point, the beamformed distributed transmission based on the feedback information.

Aspect 54: A first access point of a plurality of access points, comprising: means for receiving a first frame from at least one of the plurality of access points, the first frame including at least one identifier of at least one station associated with the at least one of the plurality of access points, the at least one station being in a different basic service set than a basic service set of the first access point; means for transmitting, to the at least one station, based on receiving the first frame, a multi-user physical layer protocol data unit (MU PPDU) including a basic service set identifier identifying the first access point, at least one station information field containing identifiers of the plurality of access points, and a plurality of physical layer service data units (PSDUs), at least one of the plurality of PSDUs containing a second frame that includes the at least one identifier of the at least one station; means for receiving feedback information from the at least one station based on transmitting the MU PPDU; and means for transmitting, from the first access point, a beamformed distributed transmission based on the feedback information.

Aspect 55: A second access point of a plurality of access points, comprising: means for receiving, from a first access point of the plurality of access points, a first frame inviting the plurality of access points to perform a beamformed distributed transmission from the plurality of access points to a group of stations; and means for transmitting, in response to receiving the first frame, a second frame for preparation of a sounding phase prior to the beamformed distributed transmission, the second frame including at least one identifier of at least one station in a basic service set of the second access point, the basic service set of the second access point being different than a basic service set of the first access point.

Aspect 56: A station, comprising: means for receiving, from a first access point of a plurality of access points, an announcement frame for performing a channel sounding procedure for a beamformed distributed transmission, the first access point being in a different basic service set than a basic service set of the station, the announcement frame including an identifier of the station; means for receiving, from the first access point, a packet for channel sounding after receiving the announcement frame; means for transmitting, to the first access point, feedback information after receiving the packet for channel sounding; and means for receiving, from the first access point, the beamformed distributed transmission after transmitting the feedback information.

Aspect 57: A first access point of a plurality of access points, comprising: a transmitter configured to transmit, to the plurality of access points, a first frame inviting the plurality of access points to perform a beamformed distributed transmission from the plurality of access points to a group of stations; a receiver configured to receive a second frame from at least one of the plurality of access points based on transmitting the first frame, the second frame including at least one identifier of at least one station in a different basic service set than a basic service set of the first access point; and a processing system configured to identify the group of stations based on the at least one identifier included in the second frame, wherein the transmitter is further configured to transmit, to at least a subset of the group of stations, an announcement frame for performing a channel sounding procedure for the beamformed distributed transmission, the announcement frame including the at least one identifier, the transmitter is further configured to transmit a packet for channel sounding after transmitting the announcement frame, the receiver is further configured to receive feedback information from at least the subset of the group of stations based on the packet for channel sounding, and the transmitter is further configured to transmit, to the group of stations from the first access point, the beamformed distributed transmission based on the feedback information.

Aspect 58: A first access point of a plurality of access points, comprising: a receiver configured to receive a first frame from at least one of the plurality of access points, the first frame including at least one identifier of at least one station associated with the at least one of the plurality of access points, the at least one station being in a different basic service set than a basic service set of the first access point; a transmitter configured to transmit, to the at least one station, based on receiving the first frame, a multi-user physical layer protocol data unit (MU PPDU) including a basic service set identifier identifying the first access point, at least one station information field containing identifiers of the plurality of access points, and a plurality of physical layer service data units (PSDUs), at least one of the plurality of PSDUs containing a second frame that includes the at least one identifier of the at least one station, wherein the receiver is further configured to receive feedback information from the at least one station based on transmitting the MU PPDU and the transmitter is further configured to transmit, from the first access point, a beamformed distributed transmission based on the feedback information.

Aspect 59: A second access point of a plurality of access points, comprising: a receiver configured to receive, from a first access point of the plurality of access points, a first frame inviting the plurality of access points to perform a beamformed distributed transmission from the plurality of access points to a group of stations; and a transmitter configured to transmit, in response to receiving the first frame, a second frame for preparation of a sounding phase prior to the beamformed distributed transmission, the second frame including at least one identifier of at least one station in a basic service set of the second access point, the basic service set of the second access point being different than a basic service set of the first access point.

Aspect 60: A station, comprising: a receiver configured to: receive, from a first access point of a plurality of access points, an announcement frame for performing a channel sounding procedure for a beamformed distributed transmission, the first access point being in a different basic service set than a basic service set of the station, the announcement frame including an identifier of the station and receive, from the first access point, a packet for channel sounding after receiving the announcement frame; and a transmitter configured to transmit, to the first access point, feedback information after receiving the packet for channel sounding, wherein the receiver is further configured to receive, from the first access point, the beamformed distributed transmission after transmitting the feedback information.

Aspect 61: A computer-readable medium for wireless communications by a first access point of a plurality of access points, comprising codes executable to: transmit, to the plurality of access points, a first frame inviting the plurality of access points to perform a beamformed distributed transmission from the plurality of access points to a group of stations; receive a second frame from at least one of the plurality of access points based on transmitting the first frame, the second frame including at least one identifier of at least one station in a different basic service set than a basic service set of the first access point; identify the group of stations based on the at least one identifier included in the second frame; transmit, to at least a subset of the group of stations, an announcement frame for performing a channel sounding procedure for the beamformed distributed transmission, the announcement frame including the at least one identifier; transmit a packet for channel sounding after transmitting the announcement frame; receive feedback information from at least the subset of the group of stations based on the packet for channel sounding; and transmit, to the group of stations from the first access point, the beamformed distributed transmission based on the feedback information.

Aspect 62: A computer-readable medium for wireless communications by a first access point of a plurality of access points, comprising codes executable to: receive a first frame from at least one of the plurality of access points, the first frame including at least one identifier of at least one station associated with the at least one of the plurality of access points, the at least one station being in a different basic service set than a basic service set of the first access point; transmit, to the at least one station, based on receiving the first frame, a multi-user physical layer protocol data unit (MU PPDU) including a basic service set identifier identifying the first access point, at least one station information field containing identifiers of the plurality of access points, and a plurality of physical layer service data units (PSDUs), at least one of the plurality of PSDUs containing a second frame that includes the at least one identifier of the at least one station; receive feedback information from the at least one station based on transmitting the MU PPDU; and transmit, from the first access point, a beamformed distributed transmission based on the feedback information.

Aspect 63: A computer-readable medium for wireless communications by a second access point of a plurality of access points, comprising codes executable to: receive, from a first access point of the plurality of access points, a first frame inviting the plurality of access points to perform a beamformed distributed transmission from the plurality of access points to a group of stations; and transmit, in response to receiving the first frame, a second frame for preparation of a sounding phase prior to the beamformed distributed transmission, the second frame including at least one identifier of at least one station in a basic service set of the second access point, the basic service set of the second access point being different than a basic service set of the first access point.

Aspect 64: A computer-readable medium for wireless communications by a station, comprising codes executable to: receive, from a first access point of a plurality of access points, an announcement frame for performing a channel sounding procedure for a beamformed distributed transmission, the first access point being in a different basic service set than a basic service set of the station, the announcement frame including an identifier of the station; receive, from the first access point, a packet for channel sounding after receiving the announcement frame; transmit, to the first access point, feedback information after receiving the packet for channel sounding; and receive, from the first access point, the beamformed distributed transmission after transmitting the feedback information.

The various operations of methods described above may be performed by any suitable means capable of performing the corresponding functions. The means may include various hardware and software component(s) and module(s), including, but not limited to a circuit, an application specific integrated circuit (ASIC), or processor. Generally, where there are operations illustrated in the Figures, those operations may be performed by any suitable corresponding counterpart means plus function components.

According to some implementations, such means may be implemented by processing systems configured to perform the corresponding functions by implementing various algorithms (such as in hardware or by executing software instructions) described above. For example, means for identifying may include a processing system. Additionally, means for transmitting may include at least one antenna and/or one or more transmitter. Likewise, means for receiving may include at least one antenna and/or one or more receiver.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the implementations disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more implementations, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communications by a first access point of a plurality of access points, comprising:
   transmitting, to the plurality of access points, a first frame inviting the plurality of access points to perform a beamformed distributed transmission from the plurality of access points to a group of stations, wherein the first frame comprises a set of unique temporary identifiers for allocation to one or more stations within the group of stations that are in a different basic service set than a basic service set of the first access point;
   receiving a second frame from at least one of the plurality of access points based on transmitting the first frame, the second frame including at least one identifier of at least one station in the different basic service set than the basic service set of the first access point;
   identifying the group of stations based on the at least one identifier included in the second frame;
   transmitting, to at least a subset of the group of stations, an announcement frame for performing a channel sounding procedure for the beamformed distributed transmission, the announcement frame including the at least one identifier;
   transmitting a packet for channel sounding after transmitting the announcement frame;
   receiving feedback information from at least the subset of the group of stations based on the packet for channel sounding; and
   transmitting, to the group of stations from the first access point, the beamformed distributed transmission based on the feedback information.

2. The method of claim 1, wherein the first frame includes an identifier of each of the plurality of access points.

3. The method of claim 1, wherein the first frame includes a temporary identifier selected from the set of unique temporary identifiers to be used as a replacement to an association identifier (AID) for the at least one station in the different basic service set than the basic service set of the first access point.

4. The method of claim 3, wherein the at least one identifier included in the second frame comprises the temporary identifier.

5. The method of claim 1, wherein the second frame includes a mapping of the at least one identifier to a media access control (MAC) address of the at least one station.

6. The method of claim 1, wherein the second frame is included in a multi-user physical layer protocol data unit (MU PPDU) received from at least a subset of the plurality of access points with resource allocation configured on a per basic service set basis.

7. The method of claim 1, wherein the second frame includes an identifier of the first access point.

8. The method of claim 1, wherein the second frame includes an identifier of the at least one of the plurality of access points.

9. The method of claim 1, wherein the at least one identifier comprises an association identifier (AID) of the at least one station.

10. The method of claim 9, wherein the AID of the at least one station comprises a temporary identifier selected from the set of unique temporary identifiers allocated by the at least one of the plurality of access points.

11. The method of claim 1, wherein the second frame is included in a trigger-based physical layer protocol data unit (TB PPDU) received by the first access point.

12. The method of claim 1, wherein the announcement frame includes a basic service set color code of the at least one of the plurality of access points appended to the at least one identifier.

13. The method of claim 12, wherein:
   the at least one identifier and the basic service set color code are included in a station information field of the announcement frame; or
   the at least one identifier and the basic service set color code are included in an Extreme High Throughput (EHT) field of the announcement frame.

14. The method of claim 1, wherein the announcement frame comprises a Null Data Packet Announcement (NDPA), wherein the packet for channel sounding comprises a Null Data Packet (NDP), and the method further comprises:
   transmitting, to at least the subset of the group of stations, a trigger frame for soliciting the feedback information after transmitting the NDP.

15. The method of claim 14, wherein the trigger frame includes a color code of the at least one of the plurality of access points appended to the at least one identifier.

16. A method for wireless communications by a first access point of a plurality of access points, comprising:
   receiving a first frame from at least one of the plurality of access points, the first frame including at least one temporary identifier from a set of unique temporary identifiers of at least one station associated with the at least one of the plurality of access points, the at least one station being in a different basic service set than a basic service set of the first access point;
   transmitting, to the at least one station, based on receiving the first frame, a multi-user physical layer protocol data unit (MU PPDU) including a basic service set identifier identifying the first access point, at least one station information field containing identifiers of the plurality of access points, and a plurality of physical layer service data units (PSDUs), at least one of the plurality of PSDUs containing a second frame that includes the at least one temporary identifier of the at least one station;
   receiving feedback information from the at least one station based on transmitting the MU PPDU; and
   transmitting, from the first access point, a beamformed distributed transmission based on the feedback information.

17. A method for wireless communications by a second access point of a plurality of access points, comprising:
   receiving, from a first access point of the plurality of access points, a first frame inviting the plurality of access points to perform a beamformed distributed transmission from the plurality of access points to a group of stations, wherein the first frame comprises a set of unique temporary identifiers for allocation to one or more stations within the group of stations that are in a different basic service set than a basic service set of the first access point; and
   transmitting, in response to receiving the first frame, a second frame for preparation of a sounding phase prior to the beamformed distributed transmission, the second frame including at least one identifier of at least one station in a basic service set of the second access point, the basic service set of the second access point being different than the basic service set of the first access point.

18. The method of claim 17, wherein the first frame includes an identifier of each of the plurality of access points.

19. The method of claim 17, wherein the first frame includes a temporary identifier selected from the set of unique temporary identifiers to be used as a replacement to an association identifier (AID) for the at least one station in the basic service set of the second access point.

20. The method of claim 19, wherein the at least one identifier included in the second frame comprises the temporary identifier.

21. The method of claim 17, wherein the second frame includes a mapping of the at least one identifier to a media access control (MAC) address of the at least one station.

22. The method of claim 21, wherein the second frame is included in a multi-user physical layer protocol data unit (MU PPDU) transmitted to the at least one station with resource allocation configured on a per basic service set basis.

23. The method of claim 17, wherein the second frame includes an identifier of the first access point.

24. The method of claim 17, wherein the second frame includes an identifier of the second access point.

25. The method of claim 17, wherein the at least one identifier comprises an association identifier (AID) of the at least one station.

26. The method of claim 25, wherein the AID of the at least one station comprises a temporary identifier selected from the set of unique temporary identifiers allocated by the second access point.

27. The method of claim 17, wherein the second frame is included in a trigger-based physical layer protocol data unit (TB PPDU) transmitted to the first access point.

28. The method of claim 25, wherein the at least one identifier comprises a color code of the second access point appended to the AID of the at least one station.

29. The method of claim 17, further comprising:
receiving, from a third access point of the plurality of access points, a third frame for preparation of the sounding phase prior to the beamformed distributed transmission, the third frame including at least one identifier of at least one station in a different basic service set than the basic service set of the second access point.

30. The method of claim 29, further comprising:
identifying the group of stations based on the at least one identifier included in the third frame;
transmitting, to at least a subset of the group of stations, an announcement frame for performing a channel sounding procedure for the beamformed distributed transmission, the announcement frame including the at least one identifier included in the third frame;
transmitting a packet for channel sounding after transmitting the announcement frame;
receiving feedback information from at least the subset of the group of stations based on the packet for channel sounding; and
transmitting, to the group of stations from the second access point, the beamformed distributed transmission based on the feedback information.

31. A method for wireless communications by a station, comprising:
receiving, from a first access point of a plurality of access points, an announcement frame for performing a channel sounding procedure for a beamformed distributed transmission, the first access point being in a different basic service set than a basic service set of the station, the announcement frame including an identifier of the station;
receiving, from the first access point, a packet for channel sounding after receiving the announcement frame;
transmitting, to the first access point, feedback information after receiving the packet for channel sounding; and
receiving, from the first access point, the beamformed distributed transmission after transmitting the feedback information.

32. The method of claim 31, further comprising:
receiving, prior to receiving the announcement frame, a first frame from a second access point associated with the station, the first frame including the identifier of the station.

33. The method of claim 32, wherein the first frame includes an identifier of each of the plurality of access points.

34. The method of claim 32, wherein the first frame includes a mapping of the identifier to a media access control (MAC) address of the station.

35. The method of claim 32, wherein the first frame is included in a multi-user physical layer protocol data unit (MU PPDU) received from at least a subset of the plurality of access points with resource allocation configured on a per basic service set basis.

36. The method of claim 31, wherein the identifier comprises a unique, temporary identifier.

37. The method of claim 31, wherein the identifier comprises an association identifier (AID) of the station.

38. The method of claim 31, wherein the identifier comprises a color code of the second access point appended to an AID of the station.

39. The method of claim 31, wherein the announcement frame includes a color code of the second access point appended to the identifier.

40. The method of claim 39, wherein:
the identifier and the color code are included in a station information field of the announcement frame; or
the identifier and the color code are included in an Extreme High Throughput (EHT) field of the announcement frame.

41. The method of claim 31, wherein the announcement frame comprises a Null Data Packet Announcement (NDPA), wherein the packet for channel sounding comprises a Null Data Packet (NDP), and the method further comprises:
receiving, from the first access point, a trigger frame for soliciting the feedback information after receiving the NDP.

42. The method of claim 41, wherein the trigger frame includes a color code of the second access point appended to the at least one identifier.

* * * * *